(12) United States Patent
Ide et al.

(10) Patent No.: US 7,876,491 B2
(45) Date of Patent: Jan. 25, 2011

(54) MULTILEVEL OPTICAL PHASE MODULATOR

(75) Inventors: Satoshi Ide, Kawasaki (JP); Yukito Tsunoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 146 days.

(21) Appl. No.: 12/189,248

(22) Filed: Aug. 11, 2008

(65) Prior Publication Data

US 2009/0086303 A1 Apr. 2, 2009

(30) Foreign Application Priority Data

Sep. 28, 2007 (JP) ............................. 2007-255641

(51) Int. Cl.
*G02F 1/01* (2006.01)
(52) U.S. Cl. ...................... 359/279; 359/245
(58) Field of Classification Search ................. 359/279, 359/245, 248, 250, 259, 260
See application file for complete search history.

(56) References Cited

U.S. PATENT DOCUMENTS

| 7,116,460 | B2 | 10/2006 | Griffin | |
|---|---|---|---|---|
| 7,574,139 | B2 * | 8/2009 | Fu et al. | 398/98 |
| 2002/0131140 | A1 * | 9/2002 | Myers et al. | 359/239 |
| 2005/0069240 | A1 * | 3/2005 | Griffin et al. | 385/3 |
| 2006/0263097 | A1 | 11/2006 | Akiyama et al. | |
| 2006/0263098 | A1 | 11/2006 | Akiyama et al. | |
| 2007/0065161 | A1 | 3/2007 | Miura et al. | |
| 2008/0231933 | A1 * | 9/2008 | Doerr | 359/245 |

FOREIGN PATENT DOCUMENTS

| JP | 2007-43638 | 2/2007 |
|---|---|---|
| JP | 2007-82094 | 3/2007 |

OTHER PUBLICATIONS

U.S. Appl. No. 12/230,792; filed Sep. 4, 2008.*

* cited by examiner

*Primary Examiner*—Timothy J Thompson
(74) *Attorney, Agent, or Firm*—Fujitsu Patent Center

(57) ABSTRACT

To take out monitor light unaffected by a multilevel optical phase-modulated component. For the purpose, a phase-shift unit that controls phases of plural (n, n is an integral number equal to or greater than 2) input lights, plural (n, n is an integral number equal to or greater than 2) phase modulating units that respectively phase-modulate the input lights from the phase-shift units, a first coupling unit that couples and outputs the phase-modulated lights from the plural phase modulating units as multilevel optical phase-modulated signal light, and a second coupling unit that couples and outputs non-phase-modulated lights from the plural phase modulating units as coupled light are provided.

17 Claims, 30 Drawing Sheets

MULTILEVEL OPTICAL PHASE MODULATOR

BACKGROUND OF THE INVENTION

1) Field of the Invention

The present application relates to a multilevel optical phase modulator suitable for use in an optical communications system.

2) Description of the Related Art

Recently, practical development of optical transmitters for higher capacity and longer distance of optical transmission systems has been expected. Especially, introducing a real system of optical transmitters adopting an optical modulation method adapted for higher capacity and longer distance has been highly expected. To meet the expectations, optical transmission systems using optical modulation methods such as DPSK (Differential Phase Shift Keying) QPSK (Quadrature Phase Shift Keying), and DQPSK (Differential Quadrature Phase Shift Keying) have been proposed.

FIG. 29 shows a configuration of a multilevel optical phase modulator that transmits QPSK or DQPSK signals. In the multilevel optical phase modulator 2000 shown in FIG. 29, a light source (LD) 2001 generates CW (Continuous Wave) light. An optical splitter 2002 splits and guides the CW light to arms 2003, 2004. Phase modulators 2005, 2006 are provided in the arms 2003, 2004, respectively.

Each of the phase modulators 2005, 2006 includes a Mach-Zehnder interferometer and an electrode formed in an arm waveguide forming the Mach-Zehnder interferometer. The phase modulator 2005 phase-modulates the CW light using data #1 (e.g., DATA 1 and the inversion signal of DATA 1), and the phase modulator 2006 phase-modulates the CW light using data #2 (e.g., DATA 2 and the inversion signal of DATA 2). In DQPSK, data #1, #2 are coded by a DQPSK precoder (not shown).

An optical coupler 2007 couples the modulated signals obtained by the phase modulators 2005, 2006. A phase-shift unit 2008 provides a phase difference of $\pi/2$ between the optical signal guided to the optical coupler 2007 via the arm 2003 and the optical signal guided to the optical coupler 2007 via the arm 2004. By the configuration, multilevel optical phase-modulated signals such as QPSK optical signals or DQPSK optical signals are generated and output through the optical coupler 2007.

A dividing unit 2009 partially divides the multilevel optical phase-modulated signal output from the optical coupler 2007 for monitoring. A photodetector (PD) 2010 detects the multilevel optical phase-modulated signal divided by the dividing unit 2009. Specifically, the photodetector 2010 receives the multilevel optical phase-modulated signal from the dividing unit 2009 and outputs an electric signal according to its power.

A phase-shift control unit 2011 adjusts an amount of phase shift of the phase-shift unit 2008 based on the detection result by the photodetector 2010. For example, according to the dithering technology, the control unit 2011 superimposes a low-frequency signal having a relatively small amplitude on the control signal for controlling the amount of phase shift in the phase-shift unit 2008 and controls the phase-shift unit 2008 to optimize the above described amount of phase shift based on the magnitude of the low-frequency signal component contained in the monitor light detected by the photodetector 2010.

Thereby, in the phase-shift control unit 2011, by the feedback of the output signal light as the multilevel optical phase-modulated signal, the phase difference between the optical signal guided to the optical coupler 2007 via the arm 2003 and the optical signal guided to the optical coupler 2007 via the arm 2004 are stabilized to $\pi/2$ for good signal quality regardless of change in temperature, deterioration with age, or the like.

JP-A-2007-43638 and JP-A-2007-82094 disclose technologies of stabilizing the phase difference by the feedback of output signal light.

In the optical transmitter shown in FIG. 29, to stabilize the amount of phase shift provided by the phase-shift unit 2008 ("$\pi/2$" in QPSK and DQPSK), the output signal light as the multilevel optical phase-modulated signal is taken in as a signal for feedback control. Accordingly, the light formed by superimposing the low-frequency signal on the drive signals of the phase modulators 2005, 2006 and received by the photodetector 2010 contains the multilevel optical phase-modulated signal component, and when the low-frequency signal component is extracted, the multilevel optical phase-modulated signal component itself hinders the correct extraction of the low-frequency signal component.

FIG. 30 shows a comparison between light power (A) detected by the photodetector 2010 and the low-frequency signal component (B) superimposed by the phase-shift control unit 2011. As shown in FIG. 30, intensity fluctuations are caused in the low-frequency signal component detected by the photodetector 2010 due to the multilevel optical phase-modulated signal component itself which is not the low-frequency signal superimposition in the phase-shift unit 2008 and thereby, the correct extraction of the low-frequency signal component is hindered, and consequently, improvement in control accuracy is hindered.

Further, since the monitor light is taken in for controlling the amount of phase shift by dividing the output signal light of the multilevel optical phase modulator 2000, the output signal light power becomes lower.

SUMMARY OF THE INVENTION

Accordingly, an object of the invention is to provide a configuration for taking out monitor light unaffected by a multilevel optical phase-modulated signal component.

Further, another object of the invention is to provide a configuration for taking out monitor light without reduction in output light power.

In addition to the above objects, a still another object is to exert effects derived by the respective configurations illustrated in the best mode for implementing the invention described later but not obtained by the technologies of the related art.

For example, the following means is used.

That is, (1) a multilevel optical phase modulator including a phase-shift unit that controls phases of plural (n, n is an integral number equal to or greater than 2) input lights, plural (n, n is an integral number equal to or greater than 2) phase modulating units that respectively phase-modulate the input lights from the phase-shift units, a first coupling unit that couples and outputs the phase-modulated lights from the plural phase modulating units as multilevel optical phase-modulated signal light, and a second coupling unit that couples and outputs non-phase-modulated lights from the plural phase modulating units as coupled light may be used.

Further, (2) a multilevel optical phase modulator including a phase-shift unit that controls phases of plural (n, n is an integral number equal to or greater than 2) input lights, plural (n, n is an integral number equal to or greater than 2) phase modulating units that respectively phase-modulate the input lights from the phase-shift units, a first coupling unit that couples and outputs the phase-modulated lights from the plural phase modulating units as multilevel optical phase-modulated signal light, a second dividing unit that divides a part of the input lights to the plural phase modulating units, and a second coupling unit that couples and outputs divided lights from the second dividing unit as coupled light may be used.

Thus, according to the present application, since the non-phase-modulated lights from the plural phase modulating units are coupled and output as coupled light by the second coupling unit, there is an advantage that the monitor light unaffected by the multilevel optical phase-modulated component can be taken out.

Further, there is another advantage that the monitor light can be taken out without reduction in power of multilevel optical phase-modulated light as output light.

DESCRIPTION OF THE PREFERRED EMBODIMENTS

Figure 1:
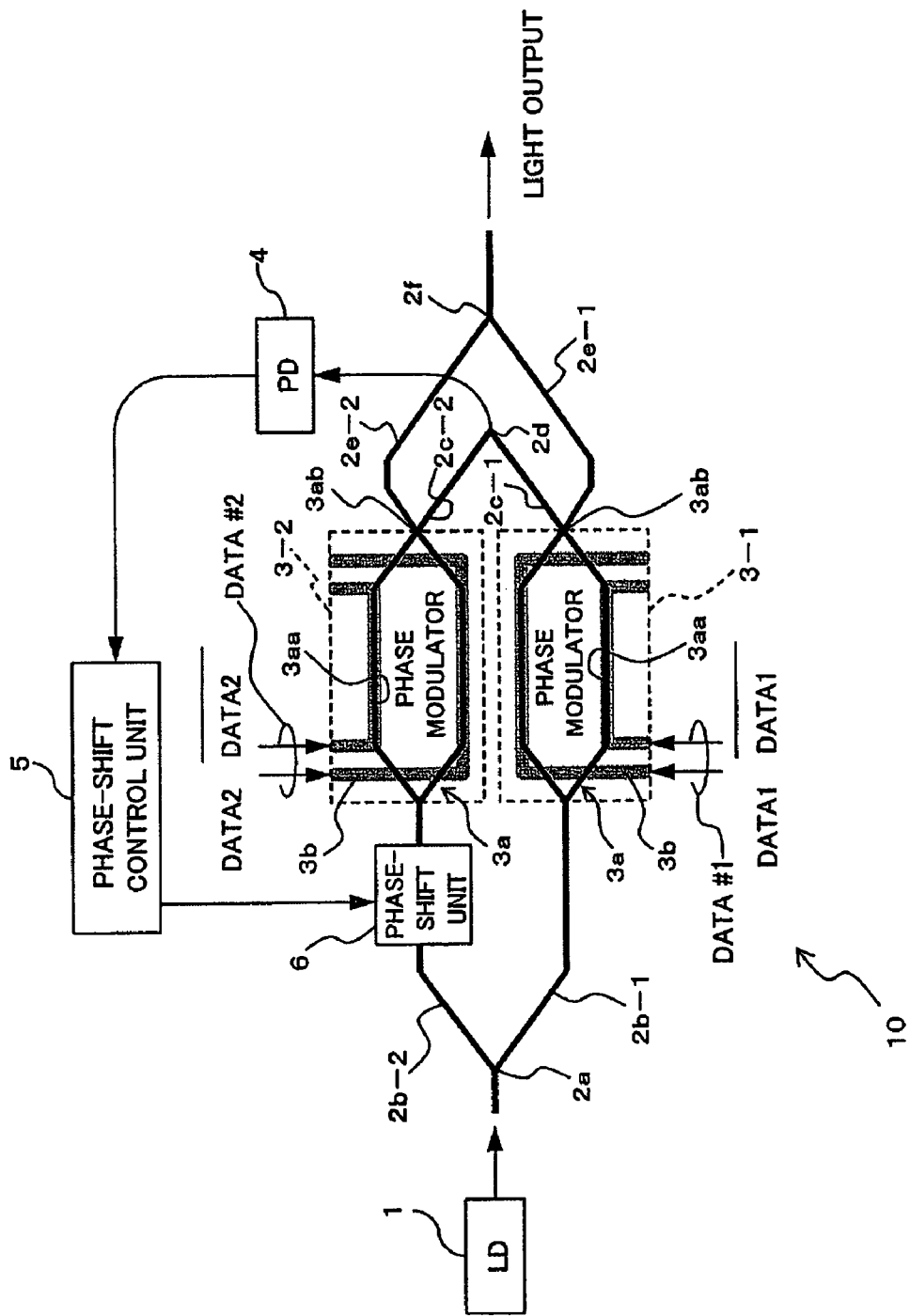
FIG. 1 shows a multilevel optical phase modulator according to a first embodiment.

Hereinafter, embodiments of the invention will be described by referring to the drawings.

The invention is not limited to the following embodiments. Further, not only the above described objects of the invention but also other technical problems, means for solving the technical problems and effects will be clear by the disclosure of the following embodiments.

[A] Explanation of First Embodiment

FIG. 1 shows a multilevel optical phase modulator 10 according to the first embodiment. The multilevel optical phase modulator 10 shown in FIG. 1 includes two Mach-Zehnder phase modulators (phase modulating units MZM) 3-1, 3-2, an optical coupler 2f as a first coupling unit and an optical coupler 2d as a second coupling unit, and a light source 1, a dividing coupler 2a, arm waveguides 2b-1, 2b-2, optical waveguides 2c-1, 2c-2, 2e-1, 2e-2, a photodetector (PD) 4, a phase-shift control unit 5, and a phase-shift unit 6.

Each of the Mach-Zehnder phase modulators 3-1, 3-2 respectively phase-modulate the input light (CW light). The lights, provided to the Mach-Zehnder phase modulators 3-1, 3-2 as input lights, respectively, are formed by dividing the CW (Continuous Wave) light output from the LD 1 into two by the dividing coupler 2a and providing them with a phase difference of $\pi/2$ from each other by the phase-shift unit 6.

Figure 29:
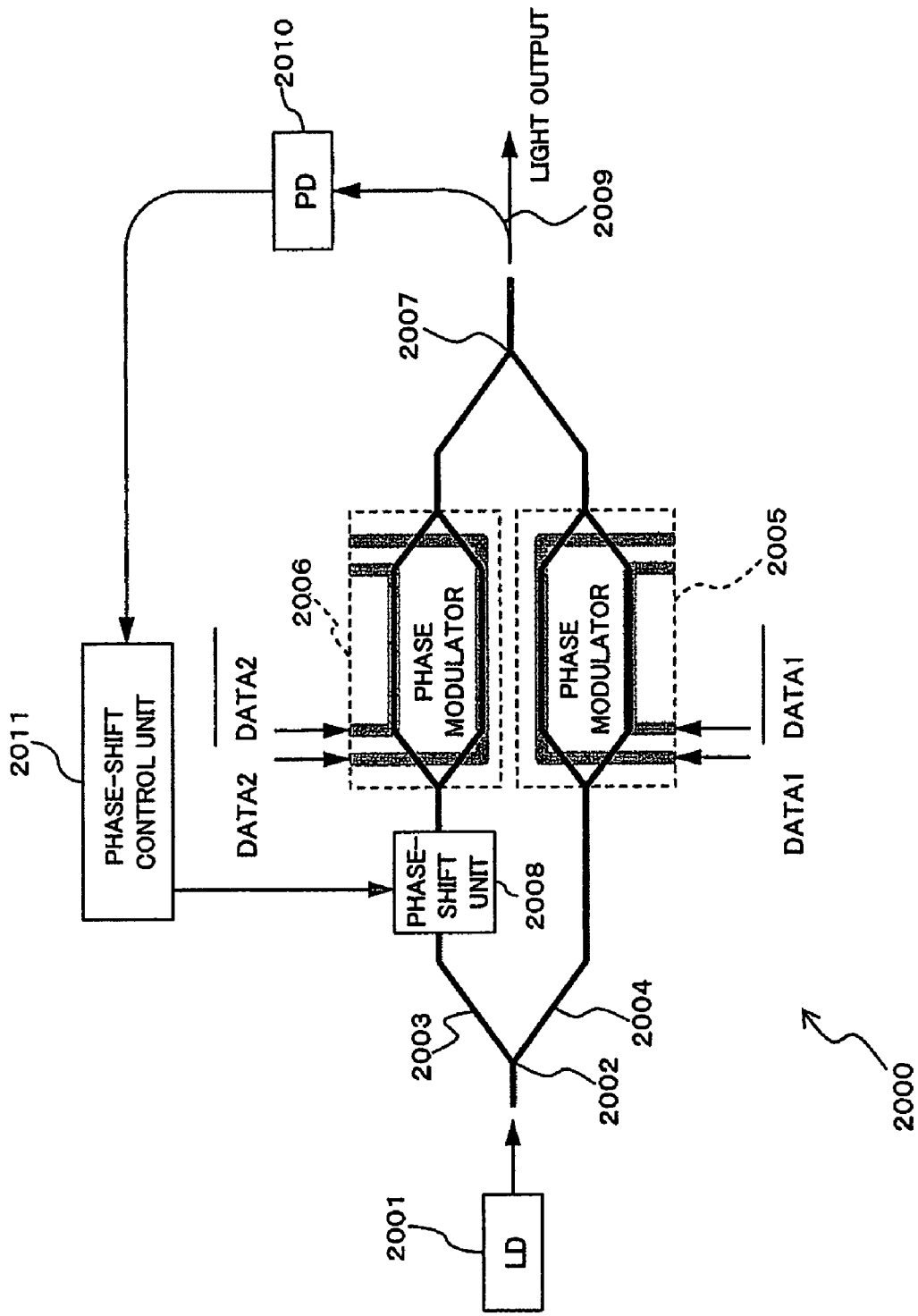
FIGS. 29 and 30 show related technologies of the invention.
Figure 30:
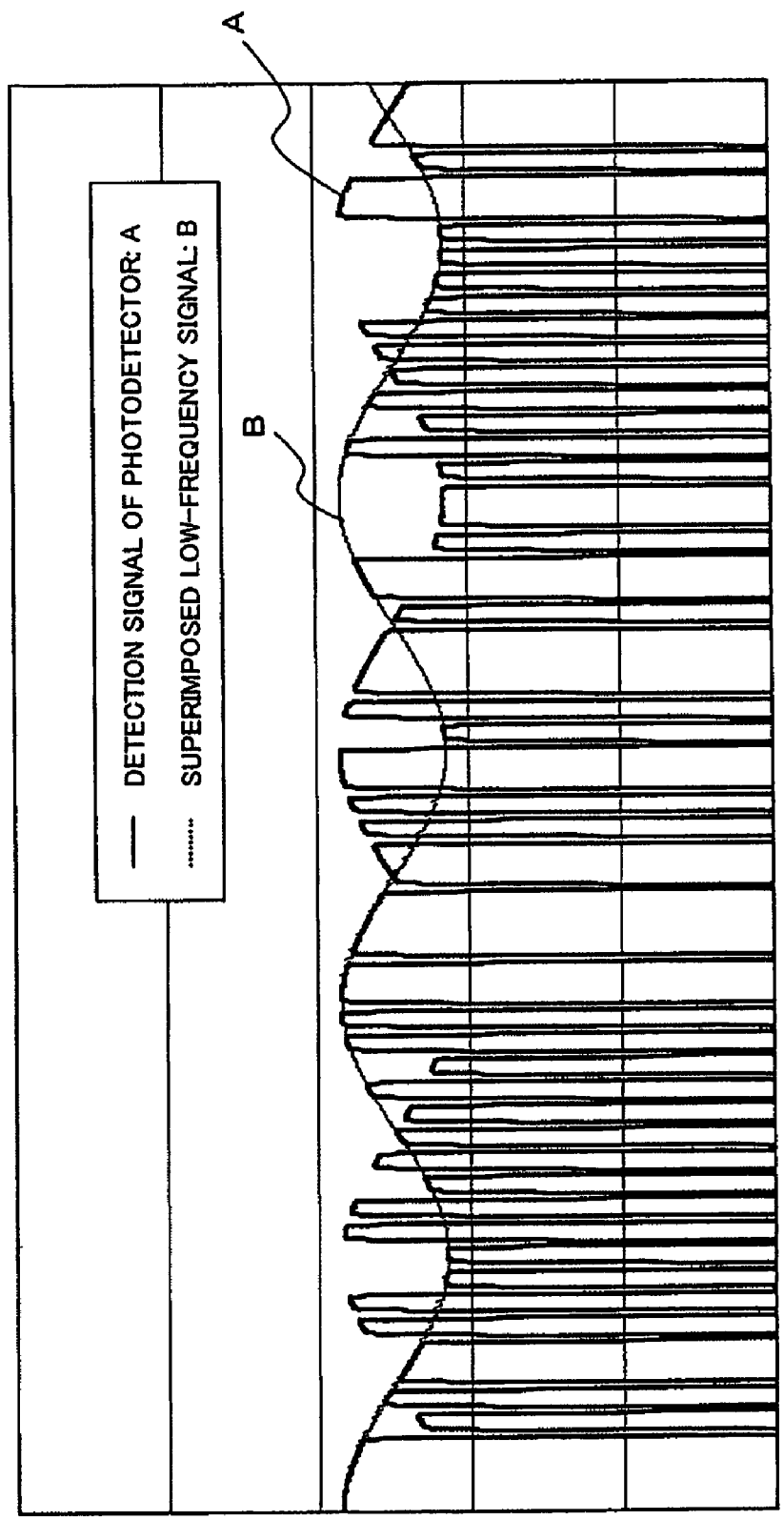

Both of the Mach-Zehnder phase modulators 3-1, 3-2 include a Mach-Zehnder interferometer 3a and an electrode 3b formed in an arm waveguide 3aa forming the Mach-Zehnder interferometer 3a like the above described modulators (2005, 2006) shown in FIG. 29. By the configuration, in the Mach-Zehnder phase modulators 3-1, 3-2, the drive signals based on the data #1, data #2 are supplied to the electrodes 3b and phase-modulated light based on the data #1, #2 is output, respectively.

Here, in the Mach-Zehnder interferometer 3a in each of the Mach-Zehnder phase modulators 3-1, 3-2, a 2-input/2-output optical coupler 3ab is formed at the output side of the arm waveguide 3aa. That is, the optical coupler 3ab couples the two arm waveguides 3aa and individually outputs two lights $\pi/2$ out of phase with each other as output lights. Here, the one output from the optical coupler 3ab is coupled to the optical waveguides 2e-1, 2e-2 as phase-modulated light, while the other output is coupled to the optical waveguides 2c-1, 2c-2 as non-phase-modulated light.

Further, the optical coupler 2f as the first coupling unit couples (multiplexes) the phase-modulated lights from the Mach-Zehnder phase modulators 3-1, 3-2 input via the optical waveguides 2e-1, 2e-2, and outputs the light as multilevel optical phase-modulated signal light by QPSK, DQPSK, or the like. In multilevel optical phase modulation, an optical signal containing information of two bits or more per one symbol can be obtained by phase modulation.

Furthermore, in the first embodiment, QPSK or DQPSK by which an optical signal containing information of four values (two bits) per one symbol is assumed; however, according to the invention, a modulation method of providing more information per symbol may be adopted. In this case, the configuration may be arranged so that the number of Mach-Zehnder phase modulators 3 is n, and the input light is divided into n by the dividing coupler 2a. Additionally, the continuous light input to each Mach-Zehnder phase modulator may be light phase-shifted at equal phase intervals of π/n by the phase-shift unit. The dividing coupler may include N-stage bi-dividing coupler and n=2^N. The continuous wave may be input to each Mach-Zehnder phase modulator by another configuration. Moreover, the embodiment is effective in a configuration of QAM (Quadrature Amplitude Modulation) in combination of amplitude modulation and phase modulation as multilevel modulation.

The optical coupler 2d as the second coupling unit couples (multiplexes) the non-phase-modulated lights from the Mach-Zehnder phase modulators 3-1, 3-2 input via the optical waveguides 2c-1, 2c-2, and outputs the light as coupled light. The optical coupler 2d may be an n-input/m-output optical coupler including plural input routes according to the number of the Mach-Zehnder phase modulators 3-1, 3-2 ("two" in the first embodiment) and m (m is an integral number equal to or greater than one) output routes for guiding the coupled lights from the plural input routes. Alternatively, the optical coupler 2d may be an n-input/2-output optical coupler including plural input routes according to the number (n) of the Mach-Zehnder phase modulators and m (m is an integral number equal to or greater than one) pairs of (first and second) output routes for guiding the coupled lights from the plural input routes. Furthermore, the optical coupler 2d may include m 2-input/1-output couplers having two of plural (n) input routes according to the number (n) of the Mach-Zehnder phase modulators as inputs, or may include m 2-input/2-output couplers having two of plural (n) input routes according to the number (n) of the Mach-Zehnder phase modulators as inputs.

The photodetector 4 receives the coupled light output by the optical coupler 2d, and outputs an electric signal according to the light power to the phase-shift control unit 5. The phase-shift unit 6 phase-shifts the two CW lights divided by the dividing coupler 2a with a phase difference of π/2. Specifically, the phase-shift unit 6 variably controls the amount of phase shift of at least one of the two lights divided by the dividing coupler 2a according to the electric signal applied from the phase-shift control unit 5, which will be described later.

In the first embodiment, phase shift of π/2 is performed on the CW light guided to the phase modulator 3-2 of the CW light divided into two by the dividing coupler 2a. In the phase-shift unit 6, when the number of division in the dividing coupler 2a is n as described above, phase shift is performed so that the respective divided continuous lights may be continuous lights at substantially equal phase intervals of π/n. Further, the phase-shift control unit 5 controls the amount of phase shift in the phase-shift unit 6 based on the coupled light received by the photodetector 4.

In this case, phase modulation of the input lights are performed also at two phase points 180 degrees out of phase according to the sign in the n Mach-Zehnder phase modulators 3; however, the phase-shift control unit 5 controls the phase-shift unit 6 to perform phase shift on the phase-modulated lights phase-modulated by the n Mach-Zehnder phase modulators 3 at equal phase intervals with respect to the direction of an axis passing through the above described two phase points based on the coupled light received by the photodetector 4.

Figure 2:
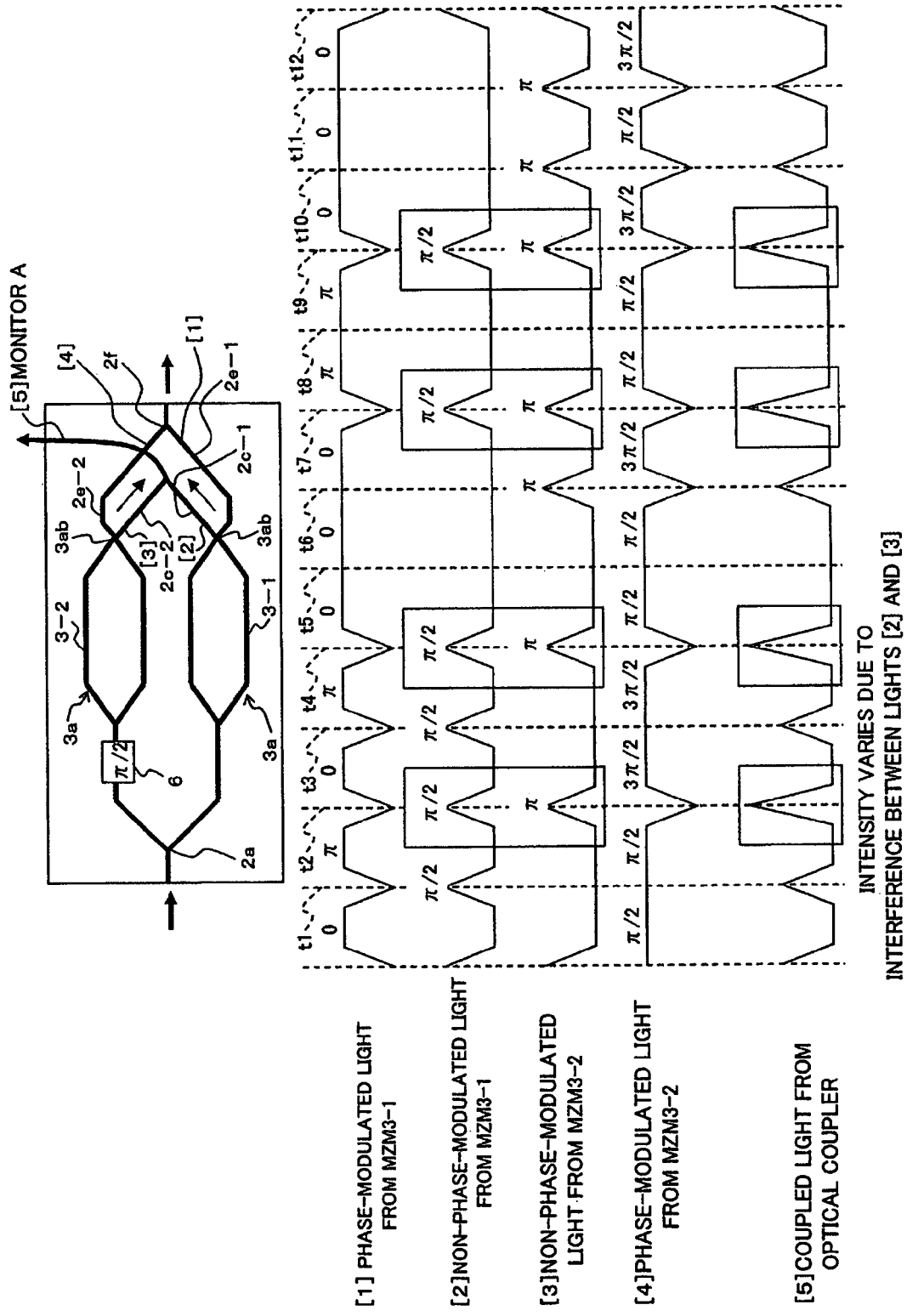
FIGS. 2 to 5 are diagrams for explanation of actions and functions of the first embodiment.

Here, as shown by [1], [4] in FIG. 2, the phase modulated lights propagating the above described optical waveguides 2e-1, 2e-2 are lights formed by phase-modulating the input lights (phase-modulated lights) according to the phase modulation signs by the Mach-Zehnder phase modulators 3-1, 3-2, while, as shown by [2], [3] in FIG. 2, the non-phase-modulated lights propagating the above described optical waveguides 2c-1, 2c-2 are lights having inverted intensity relative to that of the above described phase-modulated lights. In other words, the phase-modulated light and the non-phase-modulated light output from the optical coupler 3ab have a phase difference of π/2 from each other and have intensity patterns inverted relative to each other.

Further, as shown by [2], [3] in FIG. 2, the non-phase-modulated lights are extinguished at timings (timings within a symbol) when phase modulation is performed in phase modulated light (see [1], [4]), while the lights are emitted at timings (timings between symbols) of data transition in the phase modulated lights. Accordingly, the lights propagating the optical waveguides 2c-1, 2c-2 substantially contain almost no phase modulated component.

Figure 3:
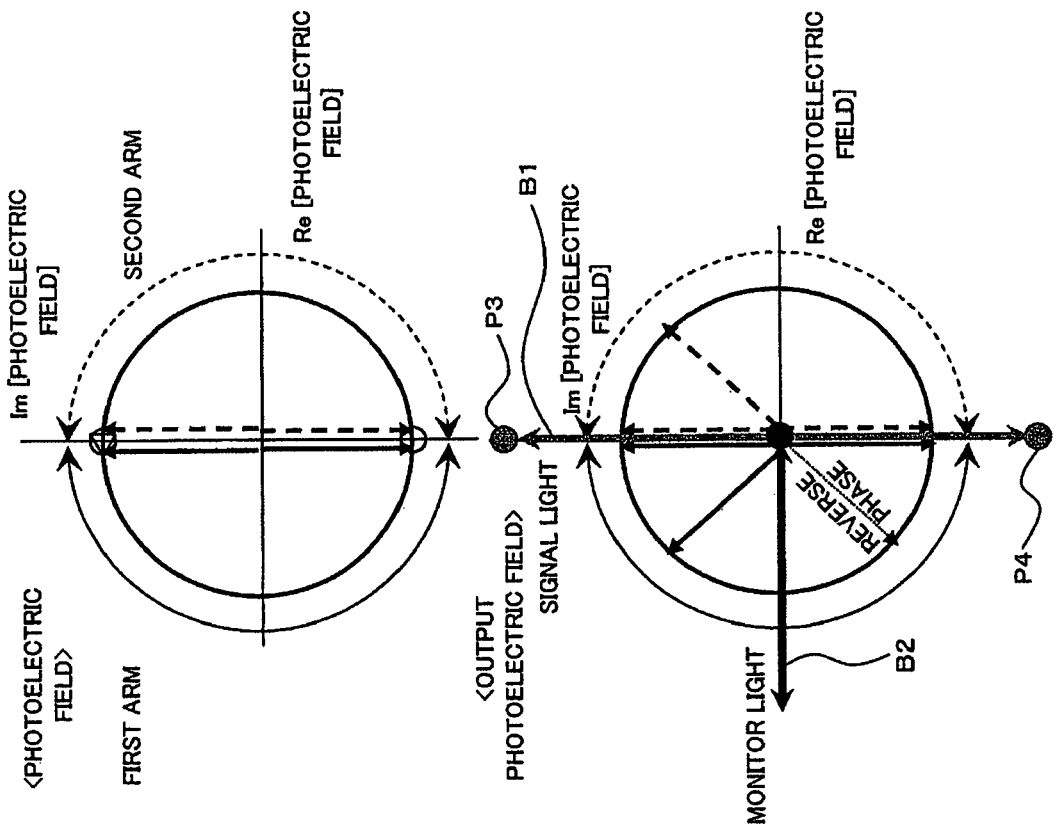
Figure 3:
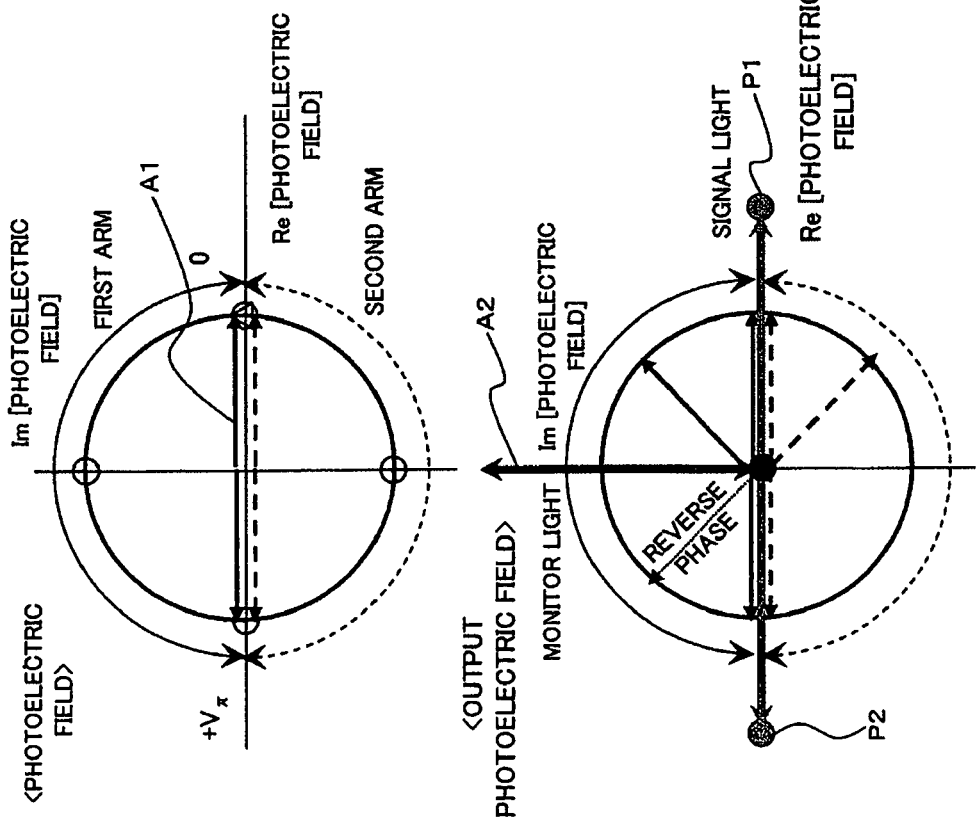

FIGS. 3A and 3B show phase statuses of the phase-modulated light and the non-phase-modulated light in the respective phase modulators 3-1, 3-2 on a photoelectric field surface. Here, in the respective arms of the phase modulator 3-1, the phase status changes in a phase region symmetric with respect to the real axis of the photoelectric field. The phase status of the phase-modulated light (signal light) output from the phase modulator 3-1 changes between "0" (phase point P1) and "π" (at 180 degrees with respect to "0") (phase point P2) according to the bit value of the data #1 in the real part component of the photoelectric field as shown in A1 of FIG. 3A. On the other hand, the phase status of the non-phase-modulated light (monitor light) output from the phase modulator 3-1 is expressed as the imaginary part component of the photoelectric field when the phase status of the phase-modulated light transits between P1 and P2 as shown in A2 of FIG. 3A.

Further, since the input light to the phase modulator 3-2 is shifted by π/2 relative to the input light to the phase modulator 3-1, the output phase-modulated light and non-phase-modulated light are also shifted by π/2. That is, the phase status of the output phase-modulated light (signal light) changes between "π/2" (phase point P3) and "3π/2" (phase point P4) in the imaginary part component of the photoelectric field as shown in B1 of FIG. 3B, and the phase status of the non-phase-modulated light (monitor light) is expressed as the imaginary part component of the photoelectric field when the phase status of the phase-modulated light transits between P3 and P4 as shown in B2 of FIG. 3B.

In the above described multilevel optical phase modulator 2000 shown in FIG. 29, the two optical signals guided to the optical coupler 2007 correspond to the phase-modulated lights propagating the above optical waveguides 2e-1, 2e-2; however, the non-phase-modulated lights, which propagate the optical waveguides 2c-1, 2c-2 in the configuration shown in FIG. 1, are radiated (out of the arms 2003, 2004). That is, in the multilevel optical phase modulator 10 according to the first embodiment, the light power substantially equal to the light power of the phase-modulated light in the configuration shown in FIG. 29 is output to the optical coupler 2f, while the non-phase-modulated lights, which are radiated in the case of the configuration shown in FIG. 29, are propagated in the optical waveguides 2c-1, 2c-2 and coupled in the optical coupler 2d.

[5] of FIG. 2 shows intensity of the coupled light formed by coupling the lights propagating the optical waveguides 2c-1, 2c-2 (see [2], [3]) by the above described optical coupler 2d. As shown in [5] of FIG. 2, when the modulated phases in the phase modulators 3-1, 3-2 change at the same data transition timing, variations appear in the intensity of the coupled light due to the interference between the two non-phase-modulated lights (see [2], [3]). Specifically, of the data transition timings t1 to t11 in FIG. 2, the modulated phase in the phase modulator 3-1 changes between π and 0, and intensity variations of coupled light appear at timings t2, t4, t7, t9 (hereinafter, referred to as change timings) at which the modulated phase in the phase modulator 3-2 changes between π/2 and 3π/2.

In this regard, the power of the coupled light at the above change timings (timings t2, t4, t7, t9 in FIG. 2) varies depending on the status of the amount of phase shift in the phase-shift unit 6.

That is, when the amount of phase shift in the phase-shift unit 6 is not proper and smaller than π/2 (status #3-2) relative to the case where the amount of phase shift in the phase-shift unit 6 is proper (π/2) (status #3-1), the intensity of the coupled light is larger than that in the case of the status #3-1. On the other hand, when the amount of phase shift in the phase-shift unit 6 is not proper and larger than π/2 (status #3-3), the intensity of the coupled light is smaller than that in the case of the status #3-1.

Further, at timings between symbols other than the above described change timings (t1, t3, t5, t6, t8, t10, t11 in FIG. 2), both or one of the non-phase-modulated lights from the phase modulators 3-1, 3-2 are extinguished, and no interference occurs and no variation is caused depending on the amount of phase shift in the coupled light power. When both of the non-phase-modulated lights from the phase modulators 3-1, 3-2 are extinguished at timings between symbols, (see t5, t8 in FIG. 2), the coupled light is small.

When an electric signal according to the intensity of the coupled light from the photodetector 4 is input, the phase-shift control unit 5 controls the phase-shift unit 6 so that the amount of phase shift in the phase-shift unit 6 may be proper (π/2) based on the electric signal. Specifically, the phase-shift control unit 5 derives an average value of the electric signals from the photodetector 4 during a desired period and controls the amount of phase shift in the phase-shift unit 6 based on the derived average value.

As described above, the light power varies at the change timings depending on the status of the amount of phase shift in the phase-shift unit 6. The distribution of the change timings on the time axis is random. However, for example, an average value of the electric signals from the photodetector 4 during a period in which the average value can be identified as the statistical average of change timings. With the average value obtained in this manner, the variations in detector signal can be observed according to the amount of phase shift, and the status of the amount of phase shift can be determined.

Figure 4:
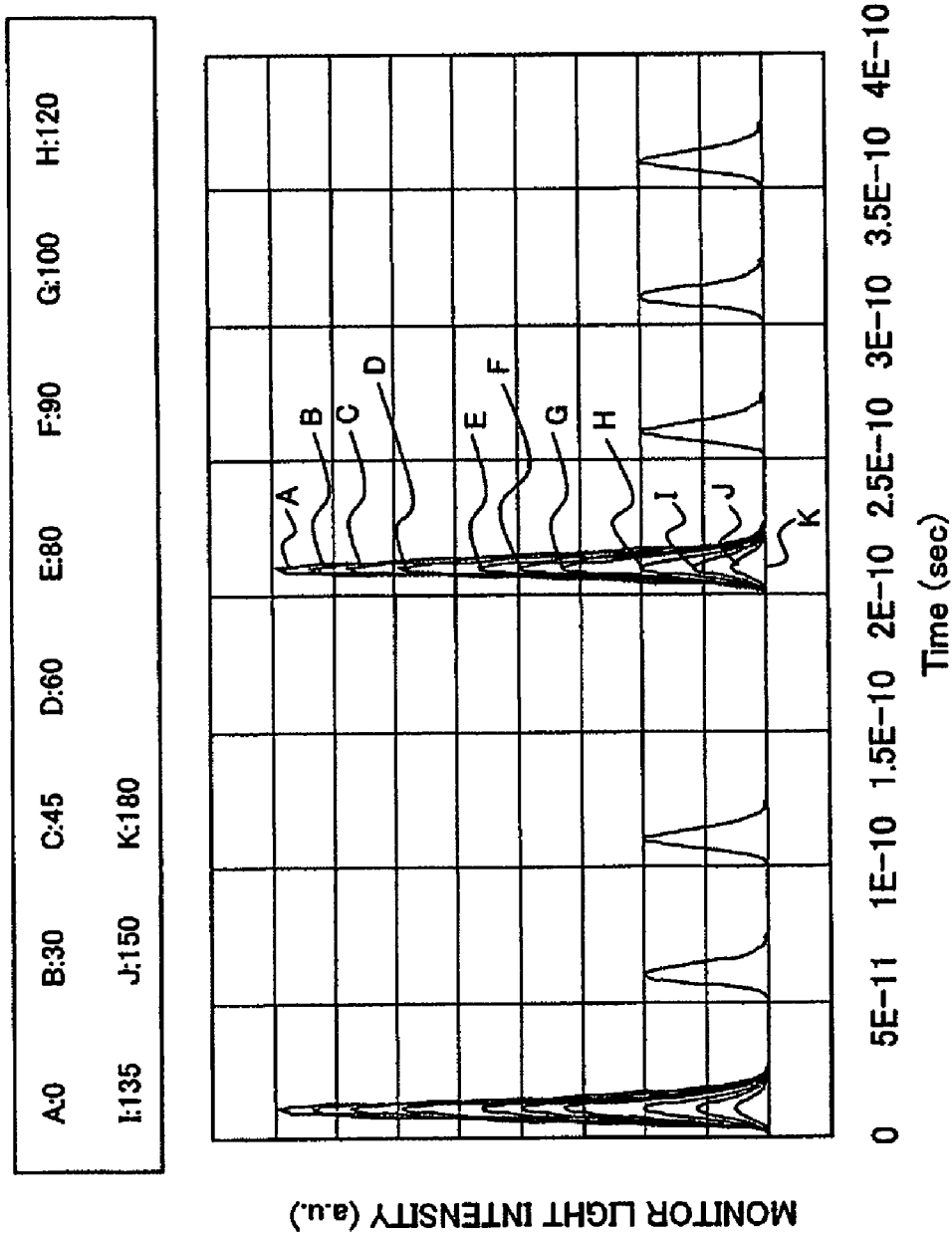
Figure 5:
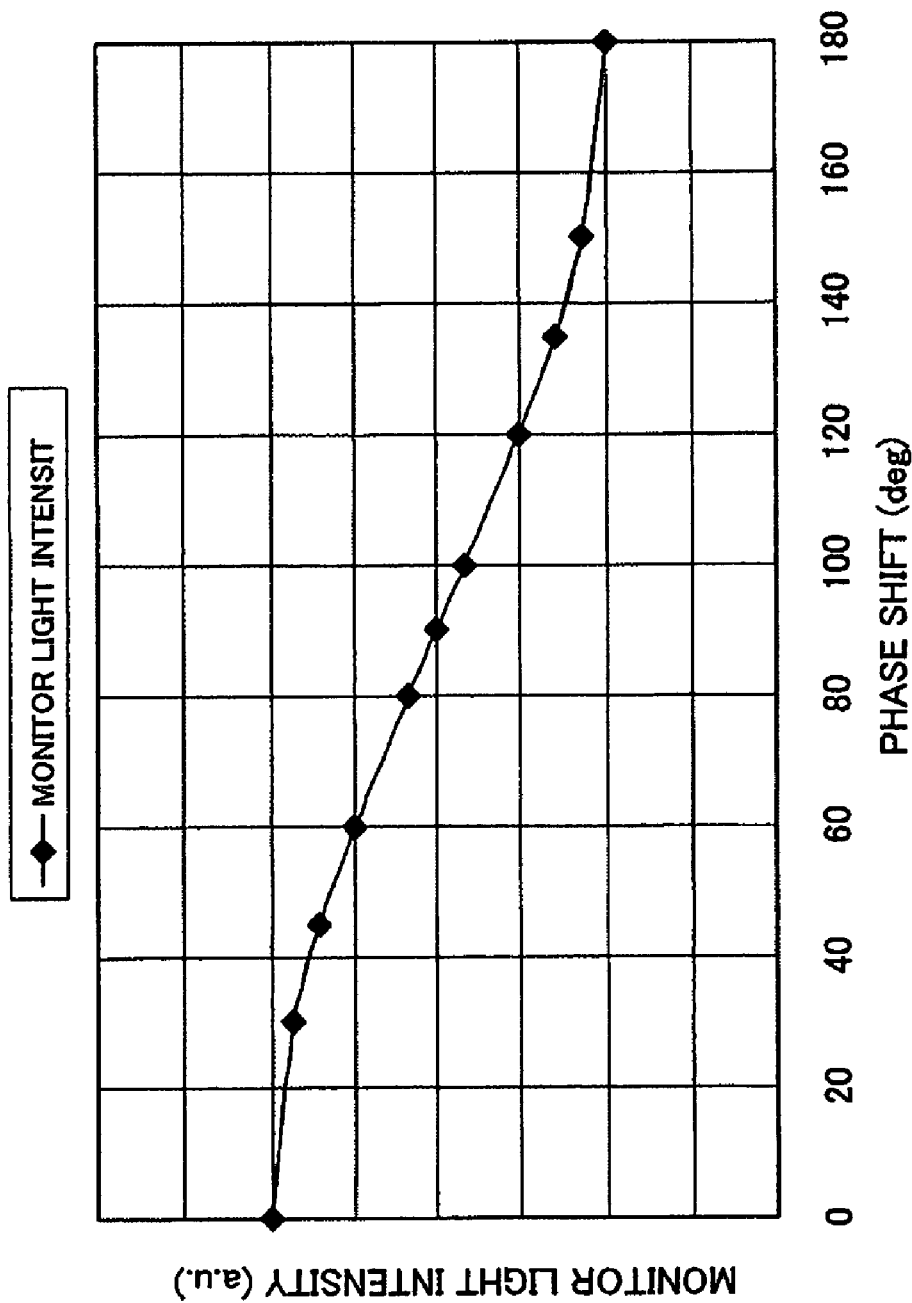

FIG. 4 shows simulation results of monitor intensity of the coupled light depending on values of the amounts of phase shift with respect to data transition timings. In FIG. 4, A to K are results when the amounts of phase shift as a parameter are "0", "30", "45", "60", "80", "90", "100", "120", "135", "150", "180" ("degree(s)"), respectively. FIG. 5 shows a simulation result of the electric signal value derived as the average value.

As shown in FIG. 4, the light power of the coupled light (monitor intensity) at change timings largely varies depending on the amount of phase shift. Regarding the simulation result of the average value, as shown in FIG. 5, obtained is the result such that the light power changes depending on the amount of phase shift under the influence of the intensity change at the change timings as described above. In other words, the average value when the amount of phase shift is proper can be uniquely specified as a reference value.

In the phase-shift control unit 5 of the first embodiment, the average value of the electric signals detected in the photodetector 4 is derived, the amount of phase shift in the phase-shift unit 6 is variably controlled according to the difference from the average value (reference value) when the derived average value and the phase difference are proper.

A part or all of the respective component elements that form the above described multilevel optical phase modulator 10 may be integrated on a substrate made of lithium niobate or the like.

Figure 6:
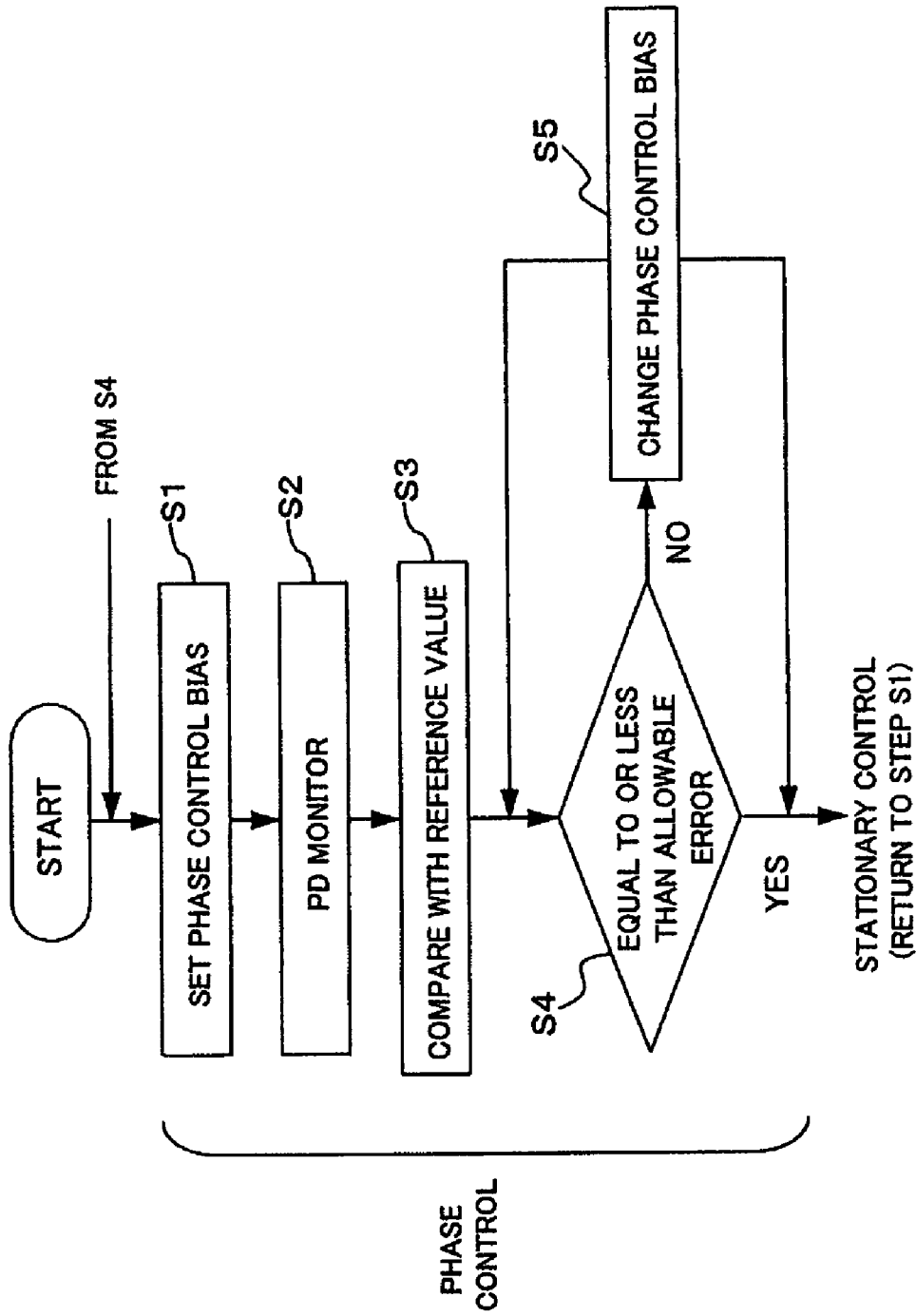
FIG. 6 is a flowchart for explanation of an operation of the first embodiment.

FIG. 6 is a flowchart for explanation of the control of the multilevel optical phase modulator 10 configured as described above.

In the multilevel optical phase modulator 10 according to the first embodiment, the phase difference of the CW lights input to the phase modulators 3-1, 3-2 is provided by the amount of phase shift in the phase-shift unit 6 given by the amount of control (phase control bias) set in the phase-shift control unit 5 (step S1). In the photodetector 4, the level of the coupled light of the non-phase-modulated lights output from the respective phase modulators 3-1, 3-2 is monitored ("PD monitor" at step S2). In the phase-shift control unit 5, the average value of the monitor results in the photodetector 4 is derived, and the derived average value and the average value (reference value) when the phase difference is proper are compared (step S3).

Consequently, when the difference between the derived average value and the reference value is equal to or less than the allowable error, the control signal is output to the phase-shift unit 6 so that the amount of phase shift to the phase-shift unit 6 may be maintained (from YES route of step S4 to step S1). On the other hand, when the difference is greater than the allowable error, the control signal is output to the phase-shift unit 6 so that the amount of phase shift to the phase-shift unit 6 may be changed to fall within the allowable error (from NO route of step S4 to step S5).

As described above, according to the first embodiment, since the non-phase-modulated lights from the plural Mach-Zehnder phase modulators can be coupled and output as coupled light by the optical coupler 2d as the second coupling unit, there are advantages that the monitor light unaffected by the multilevel phase-modulated component can be taken out, and the monitor light can be taken out without reduction of the power of the multilevel phase-modulated light

[A1] Modification of First Embodiment

Figure 7:
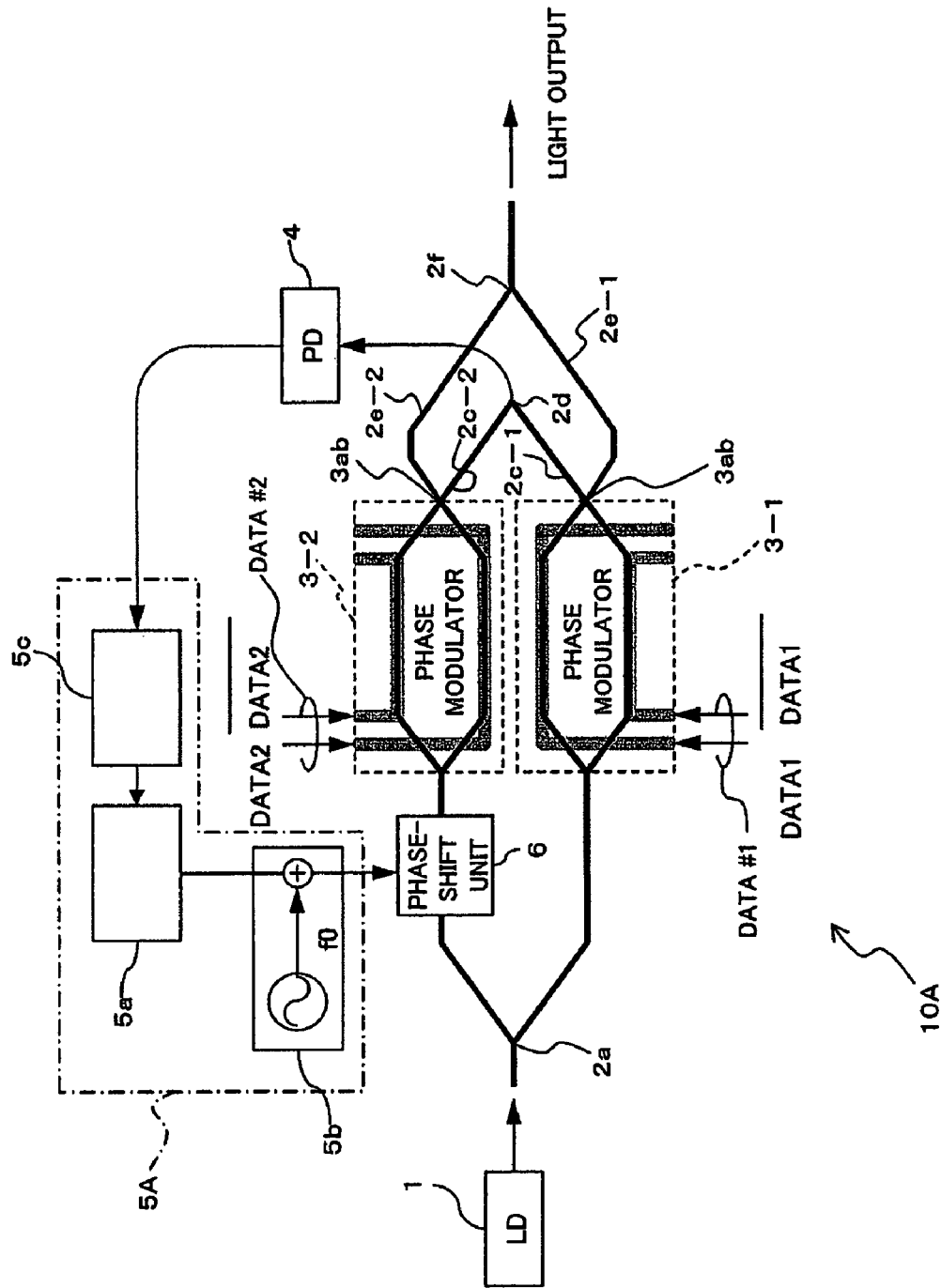
FIG. 7 shows a multilevel optical phase modulator according to a modification of the first embodiment.

FIG. 7 shows a multilevel optical phase modulator 10A according to a modification of the first embodiment. The multilevel optical phase modulator 10A shown in FIG. 7 is different from the one in the above described first embodiment (see the sign 10 in FIG. 1) in that a phase-shift control unit 5A that searches for the optimum amount of phase shift by dithering is provided, but the rest of the configuration is basically the same. In FIG. 7, the same signs as those in FIG. 1 show nearly the same parts.

A part or all of the functions of the phase-shift control unit 5A of the multilevel optical phase modulator 10A shown in FIG. 7 may be formed by a DSP (Digital Signal Processor), and may include a first bias applying unit 5a, a first intensity modulation applying unit 5b and a first bias control unit 5c as equivalent function units. Here, the first bias applying unit 5a applies a bias electric signal for phase control in the phase-shift unit 6. Further, the first intensity modulation applying unit 5b applies intensity modulation having a repetition cycle at low frequency f0 to the bias electric signal for phase control from the first bias applying unit 5a and supplies the signal to the phase-shift unit 6.

Furthermore, the first bias control unit 5c controls the bias electric signal for phase control in the first bias applying unit 5a based on the coupled light received by the photodetector 4.

That is, in the first intensity modulation applying unit 5*b*, intensity modulation is performed on the bias electric signal for phase control so that the amount of phase shift may vary in a minute range of the amount of phase shift of about five degrees, for example, in the above described FIG. 5. In this regard, as the region of the amount of phase shift subjected to intensity modulation becomes closer to 90 degrees ($\pi/2$), the monitor light intensity changes in a fashion more steeply and more linearly as shown in FIG. 5. On the other hand, as the region of the amount of phase shift subjected to intensity modulation becomes farther from 90 degrees ($\pi/2$), the monitor light intensity changes more gently with more curvature.

Figure 8:
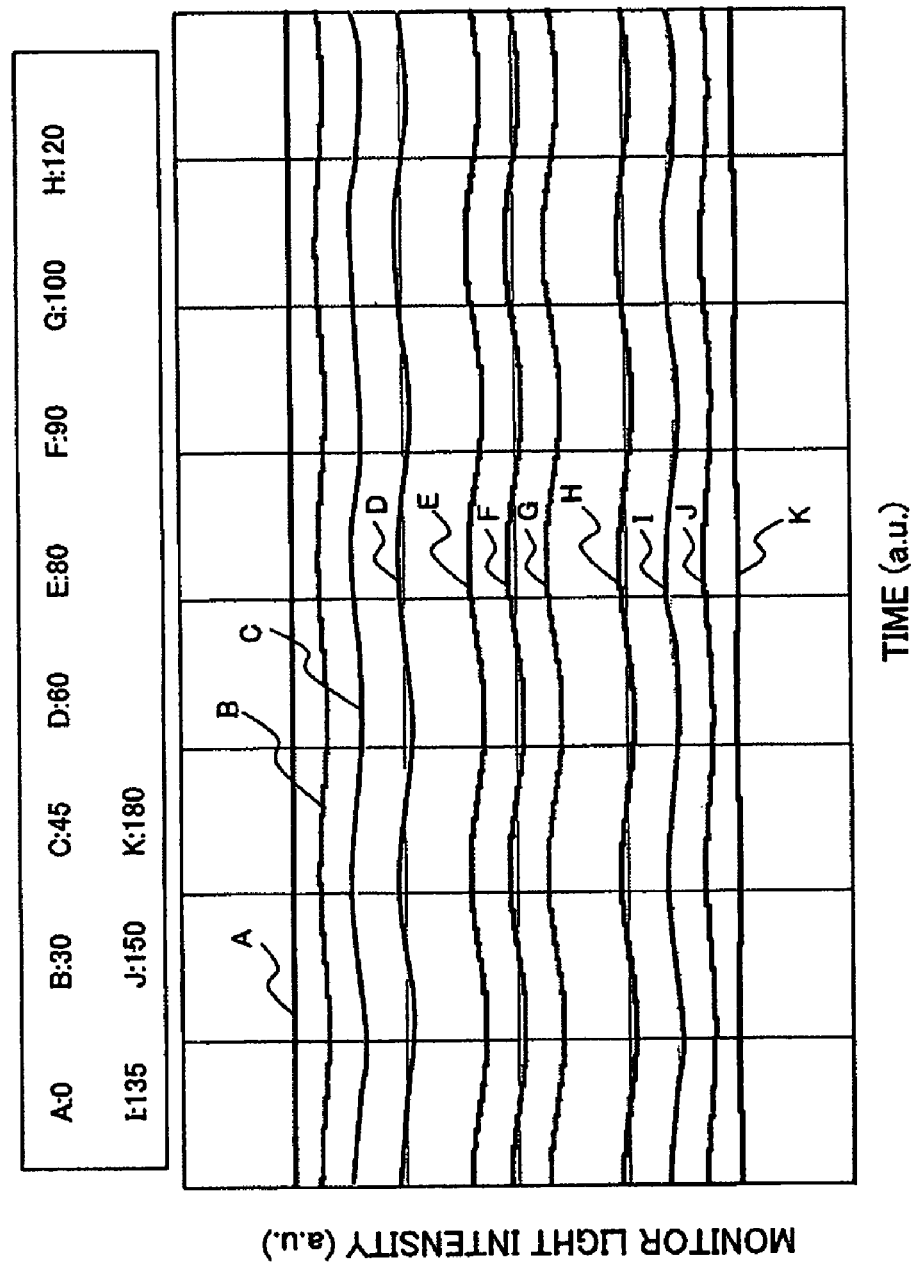
FIGS. 8 and 9 are diagrams for explanation of actions and functions of the modification of the first embodiment.

FIG. 8 shows values according to the amounts of phase shift with respect to the change of the detected electric signal level in the photodetector 4 on the time axis when intensity modulation having a repetition cycle at low frequency f0 is applied to the control signal to the phase-shift unit 6 as described above. In FIG. 8, A to K are results when the amounts of phase shift as a parameter are "0", "30", "45", "60", "80", "90", "100", "120", "135", "150", "180" ("degree(s)"), respectively.

As shown in FIG. 8, as the amount of phase shift becomes closer to the proper amount ($\pi/2$ radian), the amplitude of the repetition frequency f0 due to intensity modulation becomes larger. This is because, as the region of the amount of phase shift subjected to intensity modulation becomes closer to 90 degrees ($\pi/2$ radian), the monitor light intensity changes in a fashion more steeply and more linearly as described above. On the other hand, as the region of the amount of phase shift subjected to intensity modulation becomes farther from 90 degrees ($\pi/2$ radian), the monitor light intensity changes more gently with more curvature, and therefore, it is estimated that the amplitude of the repetition frequency f0 becomes smaller and the harmonic component of the frequency component twice the f0 or the like is increased.

Accordingly, in the first bias control unit 5*c*, the bias for phase control is controlled so that the frequency f0 component contained in the detected electric signal level in the photodetector 4 may be the local maximum, or the harmonic component (N×f0 component: N is an integral number equal to or greater than 2) may be the local minimum, and thus, the amount of phase shift can be optimally controlled.

Figure 9:
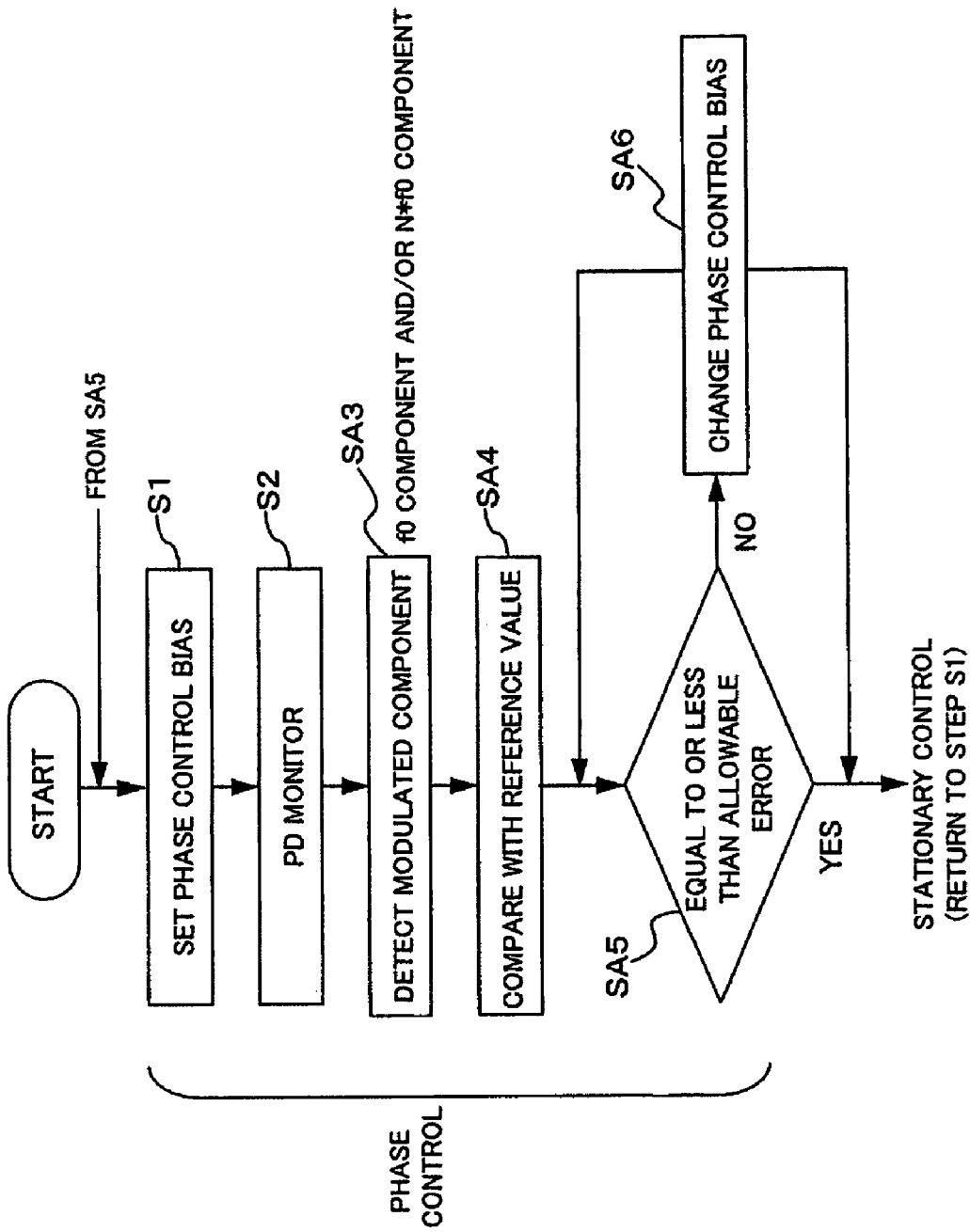

As shown in FIG. 9, the control mode of the amount of phase shift by the phase-shift control unit 5A of the multilevel optical phase modulator 10A having the above described configuration is the same as that of the above described first embodiment until the electric signal as a monitor result of the level of the coupled light is received in the photodetector 4 (steps S1, S2); however, the f0 component or harmonic component contained in the electric signal is extracted (step SA3) and the amount of phase shift is controlled so that the amplitude of the extracted frequency f0 component may take the local maximum value through the comparison with the reference value or amplitude of the harmonic component may take the local minimum value through the comparison with the reference value (steps SA4 to SA6).

Therefore, also in this case, the same advantages as those in the above described first embodiment can be obtained.

[B] Explanation of Second Embodiment

Figure 10:
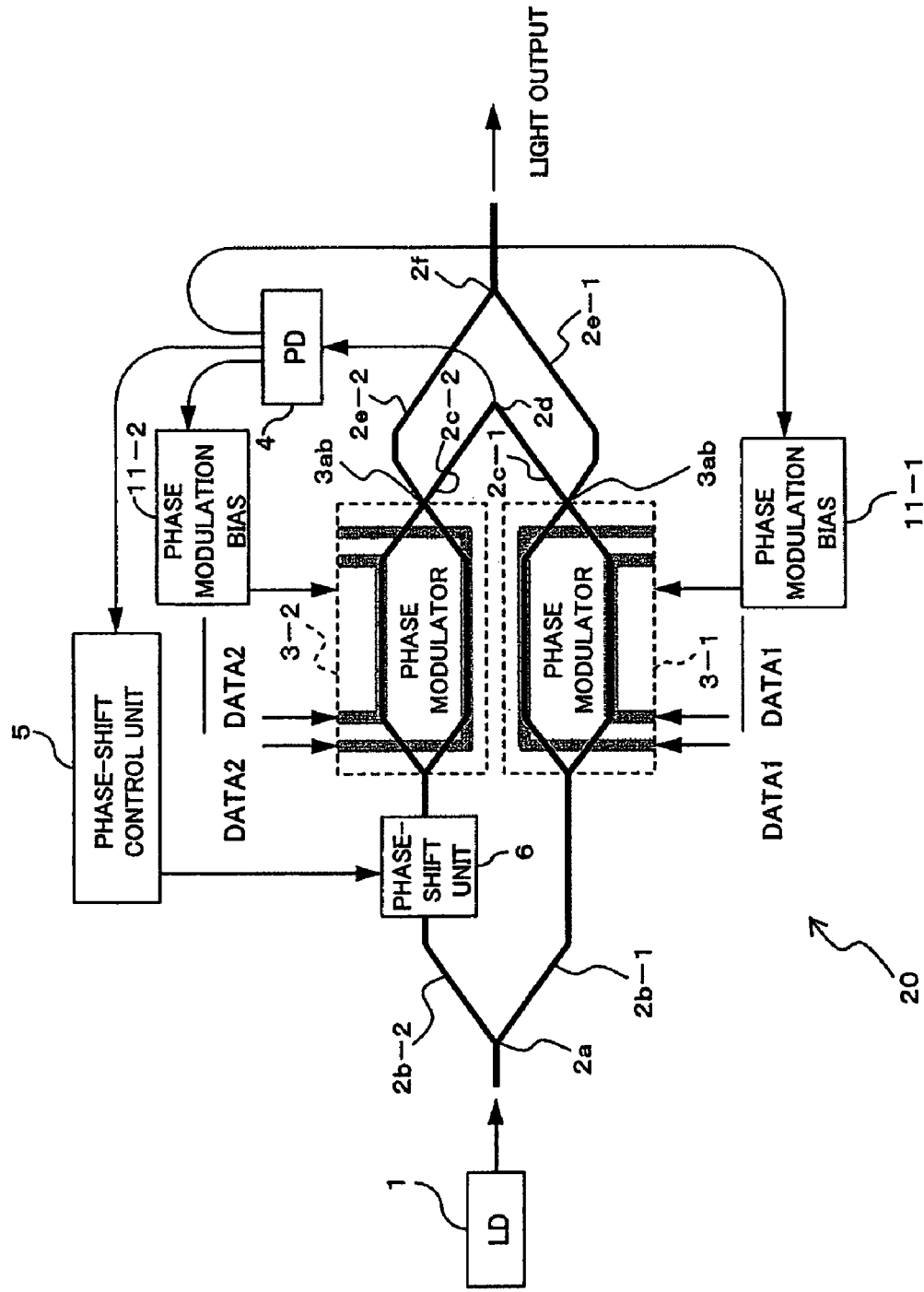
FIG. 10 shows a multilevel optical phase modulator according to a second embodiment.

FIG. 10 shows a multilevel optical phase modulator 20 according to the second embodiment. The multilevel optical phase modulator 20 shown in FIG. 10 is different from the one in the above described first embodiment (see the sign 10 in FIG. 1) in that phase modulation bias control units 11-1, 11-2 that respectively perform bias control on operating point drift of the phase modulators 3-1, 3-2 configured by LN modulators are provided. The rest of the configuration is basically the same as that of the above described first embodiment, and, in FIG. 10, the same signs as those in FIG. 1 show nearly the same parts.

When an electric signal according to the level of the coupled light of the non-phase-modulated lights from the photodetector 4 is input, the phase modulation bias control unit 11-1 controls the DC bias of the drive signal to the phase modulator 3-1 based on the electric signal, and thereby, the operating point drift in the phase modulator 3-1 is adjustable.

Similarly, when an electric signal according to the intensity of the coupled light of the non-phase-modulated lights from the photodetector 4 is input, the phase modulation bias control unit 11-2 controls the DC bias of the drive signal to the phase modulator 3-2 based on the electric signal, and thereby, the operating point drift in the phase modulator 3-2 is adjustable.

Specifically, the coupled light of the non-phase-modulated lights output according to the set bias voltage is monitored by the photodetector 4, and the electric signal as a monitor result is loaded by the phase modulation bias control unit 11-1 (or 11-2). Then, the signal is compared with the monitor reference value (of the coupled light) at which the DC drift of the phase modulator 3-1 (or 3-2) is optimum. When the difference is equal to or less than the allowable error, the bias voltage is maintained, and, when the difference is greater than the allowable error, the bias voltage is changed to be higher or lower and then the same control of changing the bias voltage based on the monitor result is repeated.

All of the controls by the above described phase modulation bias control units 11-1, 11-2 and phase-shift control unit 5 are based on the electric signal from the photodetector 4, and, if they are performed at the same time, the early stabilization of the controls may be hindered. Accordingly, the earlier stabilization of the controls can be expected in such a manner that the control of the phase-shift unit 6 by the phase-shift control unit 5 is first performed, and then, the DC bias controls of the two phase modulators 3-1, 3-2 by the phase modulation bias control units 11-1, 11-2 are sequentially performed.

As described above, according to the multilevel optical phase modulator 20 of the second embodiment, there are the same advantages as those in the above described first embodiment, and additionally, there is an advantage that the monitor light can be taken in without being affected by the multilevel optical phase-modulated component and reducing the power of the multilevel optical phase-modulated light, and the operating point drift in the Mach-Zehnder phase modulators 3-1, 3-2 can be compensated.

[B1] Explanation of First Modification of Second Embodiment

Figure 11:
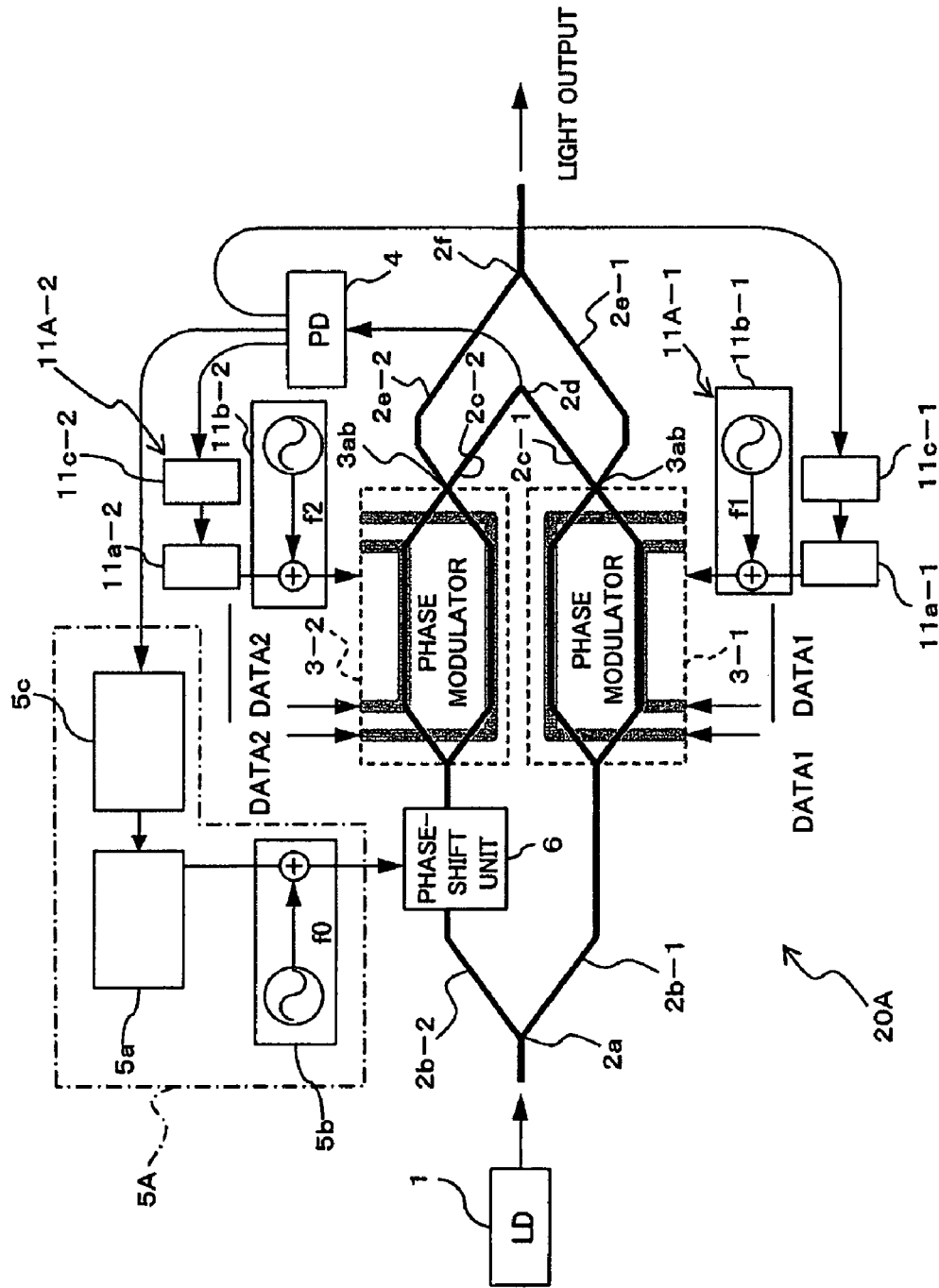
FIG. 11 shows a multilevel optical phase modulator according to a modification of the second embodiment.

FIG. 11 shows a multilevel optical phase modulator 20A according to the first modification of the second embodiment. The multilevel optical phase modulator 20A shown in FIG. 11 is different from the one shown in FIG. 7 in that phase modulation bias control units 11A-1, 11A-2 that respectively search for the optimum DC biases in the phase modulators 3-1, 3-2 are provided, but the rest of the configuration is basically the same. In FIG. 11, the same signs as those in FIG. 7 show nearly the same parts.

Here, a part or all of the functions of the phase modulation bias control units 11A-1, 11A-2, and the phase-shift control unit 5A may be formed by a DSP (Digital signal Processor). The phase modulation bias control unit 11A-1 may include a second bias applying unit 11a-1, a second intensity modulation applying unit 11b-1 and a second bias control unit 11c-1 as equivalent function units. Similarly, the phase modulation bias control unit 11A-2 may include a second bias applying unit 11a-2, a second intensity modulation applying unit 11b-2 and a second bias control unit 11c-2 as equivalent function units.

Here, the second bias applying units 11a-1, 11a-2 respectively apply bias electric signals for phase control in the phase modulators 3-1, 3-2. Further, the second intensity modulation applying units 11b-1, 11b-2 apply intensity modulation having a repetition cycle at a low frequency to the bias electric signals for phase control from the second bias applying units 11a-1, 11a-2 and supply the signals to the phase modulators 3-1, 3-2. Furthermore, the second bias control unit 11c-1, 11c-2 control the bias electric signals for phase control in the second bias applying units 11a-1, 11a-2 based on the coupled light received by the photodetector 4.

The frequencies for intensity modulation in the second intensity modulation applying units 11b-1, 11b-2 may be low-frequency signals f1, f2 different from each other, respectively, and different from the frequency f0 in the above described first intensity modulation applying unit 5b. Further, the frequencies for intensity modulation in the second intensity modulation applying units 11b-1, 11b-2 may be f0 that is the same as that of the phase-shift control unit, and may perform time-sharing control. Thereby, the first bias control unit 5c, and the second bias control units 11c-1, 11c-2 can reliably extract only the low frequency signals provided by the intensity modulation applying units 5b, 11b-1, 11b-2, which form their phase-shift control unit 5A and the phase modulation bias control units 11A-1, 11A-2.

That is, the second bias control units 11c-1, 11c-2 extract the low-frequency signal components f1, f2 provided by the second intensity modulation applying units 11b-1, 11b-2, which form the phase modulation bias control units 11A-1, 11A-2, respectively, and control the bias electric signals provided by the second bias applying units 11a-1, 11a-2 so that the intensity of the low-frequency signal components may be the local minimum.

Thereby, the phase modulation bias control units 11A-1, 11A-2 can realize the control of DC drift using the non-phase-modulated lights output from the phase modulators 3-1, 3-2. The technologies of searching for the optimum point of the DC bias by applying dithering are also disclosed in JP-A-2007-43638 and JP-A-2007-82094, for example.

Figure 12:
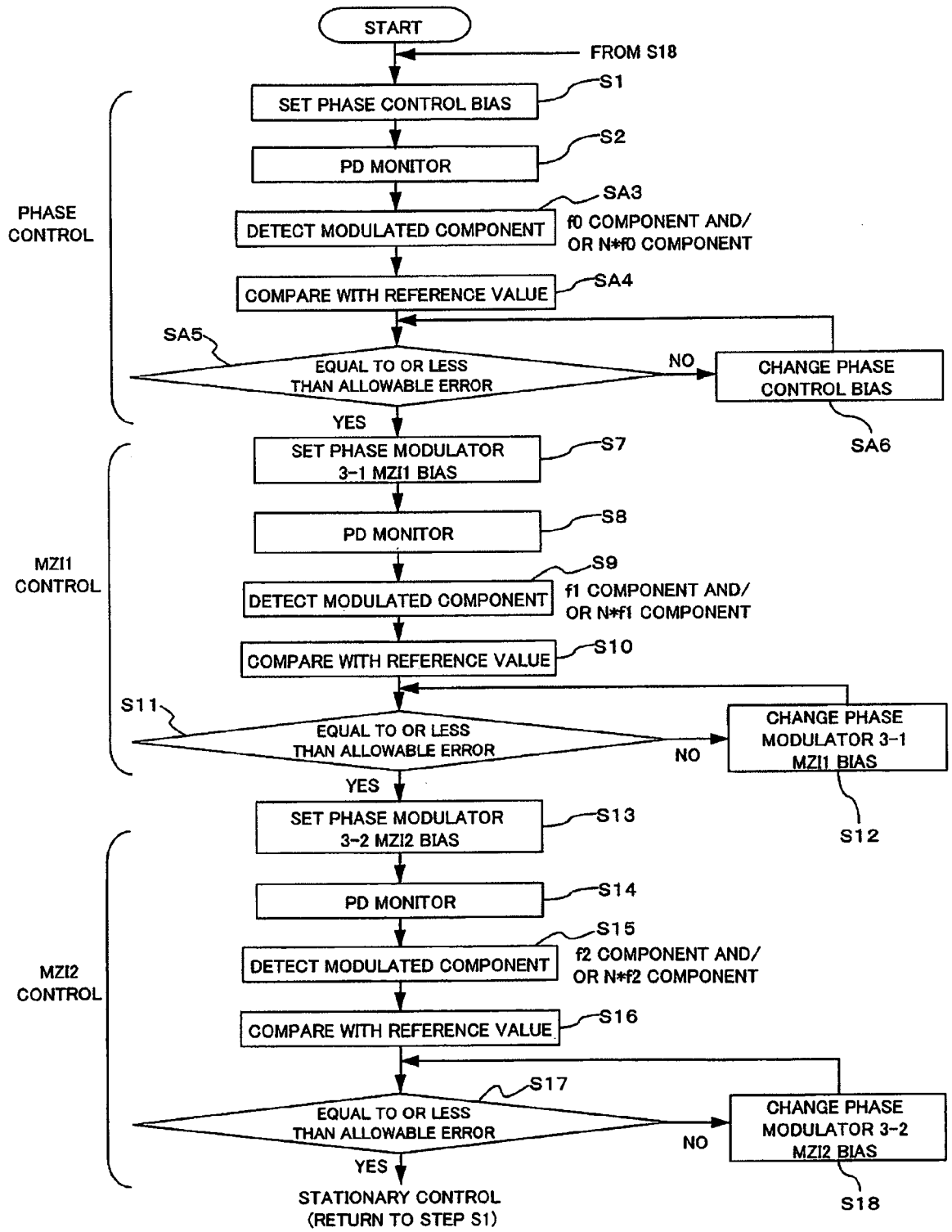
FIG. 12 is a flowchart for explanation of an operation of the modification of the second embodiment.

In the multilevel optical phase modulator 20A having the above described configuration, for example, the control of the phase-shift unit 6 in the phase-shift control unit 5A is first performed, and then, the DC bias controls of the two phase modulators 3-1, 3-2 by the phase modulation bias control units 11A-1, 11A-2 are sequentially performed. Specifically, as is the above described case in FIG. 9, one cycle of the control of the amount of phase shift is performed (steps S1, S2, SA3 to SA6 in FIG. 12).

Subsequently, in the phase modulation bias control unit 11A-1, the DC bias formed by performing intensity modulation on the DC bias of the default setting in the second bias applying unit 11a-1 at the repetition frequency of low frequency f1 in the second intensity modulation applying unit 11b-2 is supplied to the phase modulator 3-1 (step S7), and the resulting coupled light from the optical coupler 2d is received by the photodetector 4 (step S8).

Then, in the second bias control unit 11c-1, the f1 component or harmonic component contained in the electric signal according to the level of the coupled light from the photodetector 4 is extracted (step S9), and the DC bias provided in the second bias applying unit 11a-1 is controlled so that the amplitude of the extracted frequency f1 component may take the local minimum value through the comparison with the reference value or amplitude of the harmonic component may take the local maximum value through the comparison with the reference value (steps S10 to S12).

Subsequently, in the phase modulation bias control unit 11A-2 that performs bias control in the phase modulator 3-2, the same DC bias control as that in the phase modulation bias control unit 11A-1 using the frequency signal f2 is performed (steps S13 to S18), and then, sequentially, the control of the phase-shift unit 6 in the phase-shift control unit 5A and the DC bias controls in the phase modulation bias control units 11A-1, 11A-2 are repeatedly performed (step S18 to step S1).

Thus, also in the first modification of the second embodiment, the same effect as that of the above described second embodiment can be obtained.

[B2] Explanation of Second Modification of Second Embodiment

Figure 13:
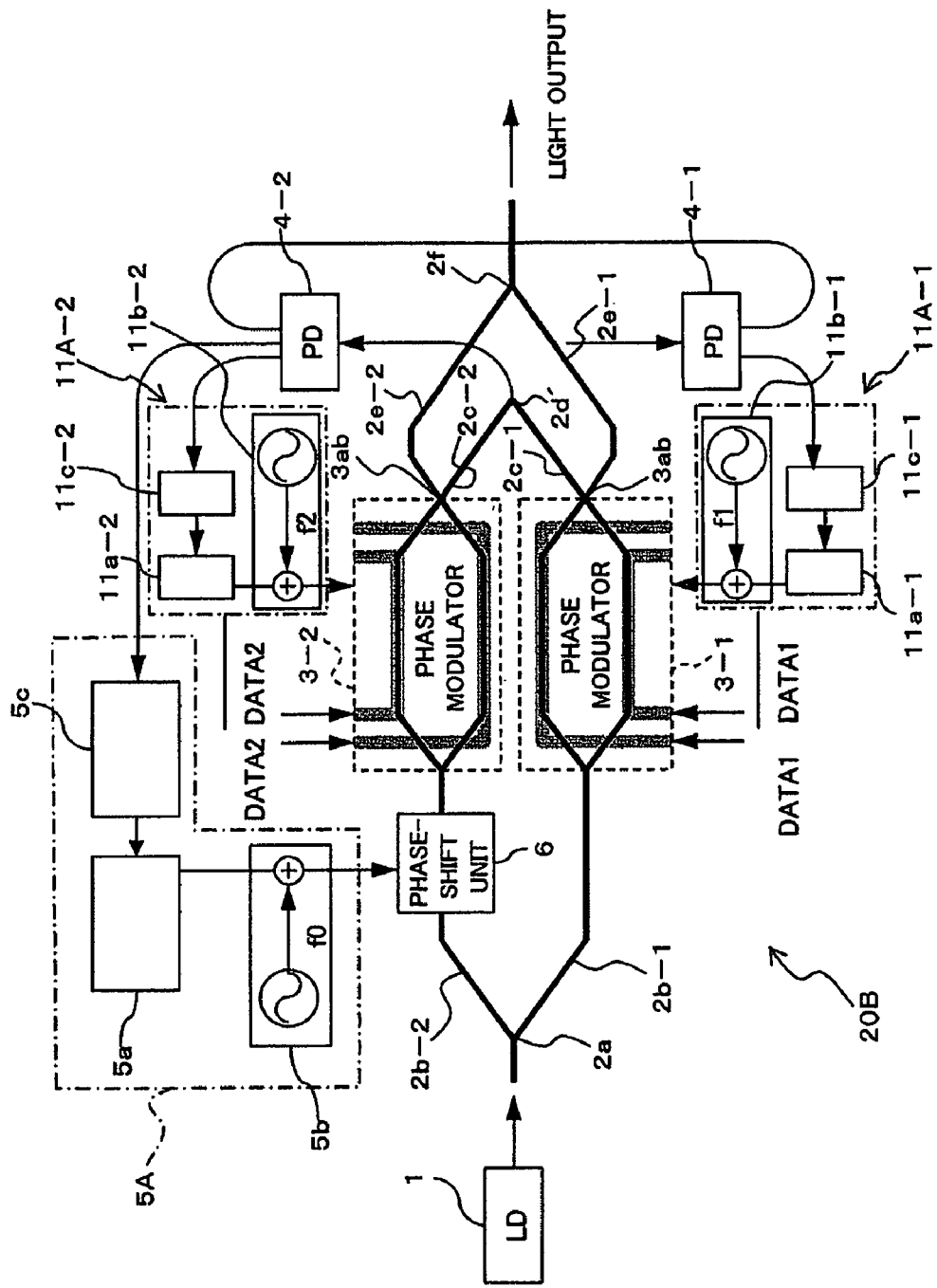
FIG. 13 shows a multilevel optical phase modulator according to a modification of the second embodiment.

FIG. 13 shows a multilevel optical phase modulator 20B according to the second modification of the second embodiment. The multilevel optical phase modulator 20B shown in FIG. 13 is different from the one shown in FIG. 11 in that an optical coupler 2d' having a 2-input/2-output configuration is provided to form the second coupling unit, and first and second photodetectors 4-1, 4-2 to which the respective two outputs of the optical coupler 2d' are optically coupled are provided. The first and second photodetectors 4-1, 4-2 respectively receive two kinds of coupled lights from the optical coupler 2d' substantially having a phase difference of 90 degrees from each other, for example, and output monitor signals.

The monitor electric signal for the coupled light received by the first photodetector 4-1 is output to the second bias control unit 11c-1 of the respective phase modulation bias control units 11A-1, 11A-2, and the monitor electric signal for the coupled light received by the second photodetector 4-2 is output to the first bias control unit 5c of the first bias control unit 5A.

Thereby, in the phase modulation bias control units 11A-1, 11A-2, respectively, the DC biases of the phase modulators 3-1, 3-2 can be controlled based on the monitor electric signals of the coupled lights from the first and second photodetectors 4-1, 4-2. The rest of the configuration is basically the same as that shown in FIG. 11, and, in FIG. 13, the same signs as those in FIG. 11 show nearly the same parts.

The two output ports in the optical coupler 2d' are output routes for respectively guiding two kinds of coupled lights substantially having a phase difference of 90 degrees from each other, for example. Thereby, the coupled light having one phase used in the above described respective embodiments may be received by the first and second photodetector 4-1, and the coupled light having the other phase unused in the above described respective embodiments may be received by the first and second photodetector 4-2.

Thus, also in the example shown in FIG. 13, the same advantage as those of the above described second embodiment can be obtained.

[C] Explanation of Third Embodiment

Figure 14:
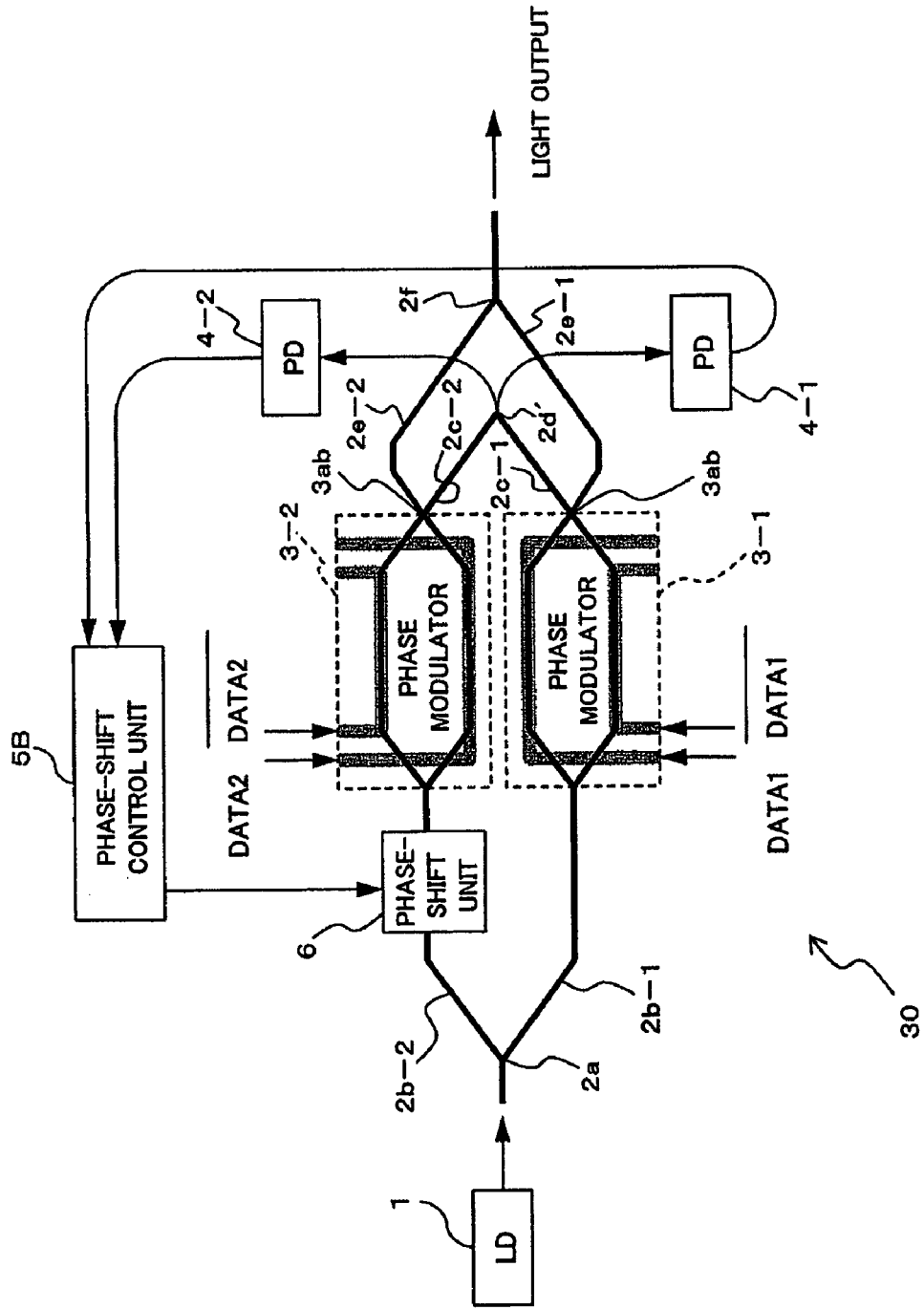
FIG. 14 shows a multilevel optical phase modulator according to a third embodiment.

FIG. 14 shows a multilevel optical phase modulator 30 according to the third embodiment. The multilevel optical phase modulator 30 shown in FIG. 14 is different from the one in the above described first embodiment (see the sign 10 in FIG. 1) in that the same optical coupler 2d' and first and second photodetectors 4-1, 4-2 shown in FIG. 13 are provided, and a phase-shift control unit 5B controls the amount of phase shift in the phase-shift unit 6 based on the difference between monitor electric signals from the first and second photodetectors 4-1, 4-2. The rest of the configuration is basically the same as that shown in FIG. 1, and, in FIG. 14, the same signs as those in FIG. 1 show nearly the same parts.

Figure 15:
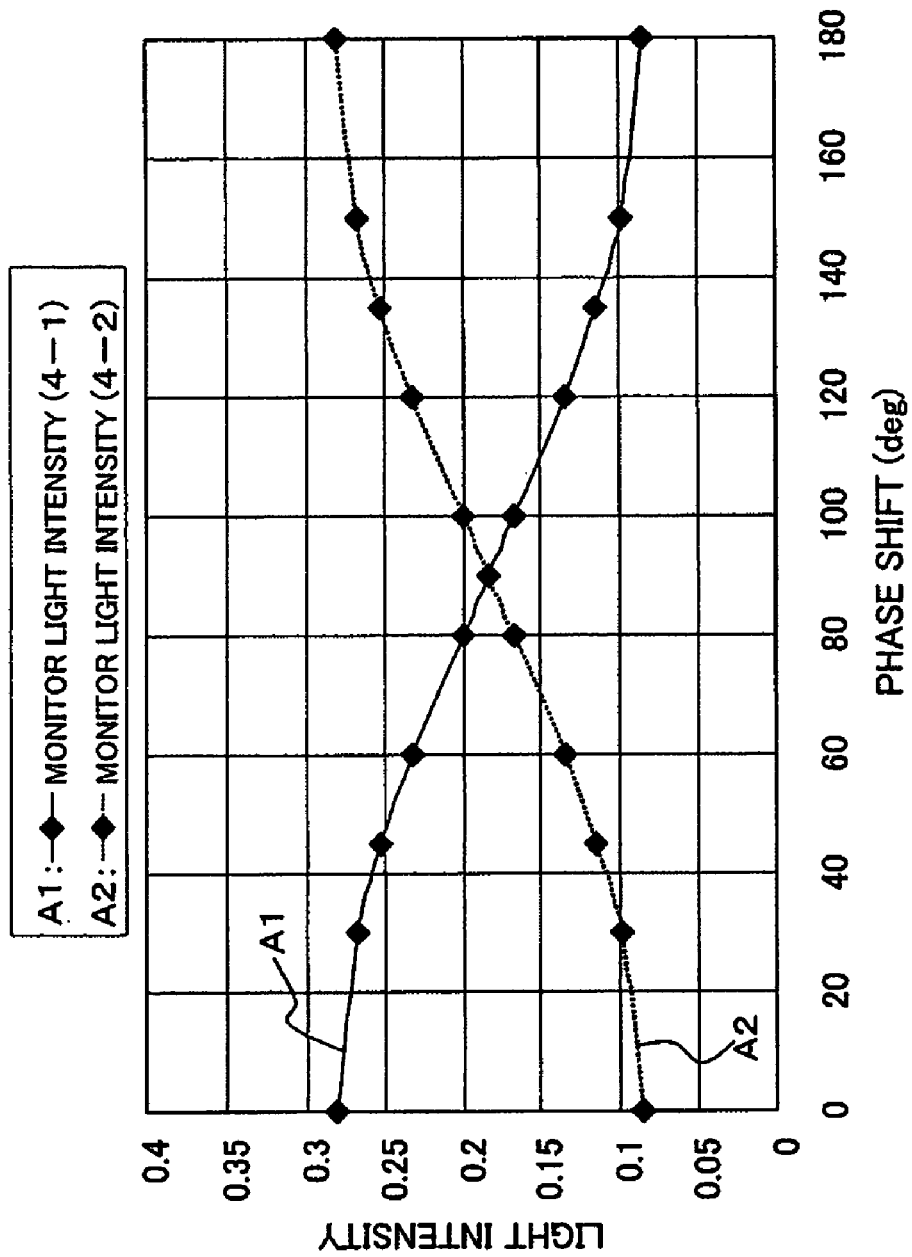
FIG. 15 is a diagram for explanation of actions and functions of the third embodiment.

FIG. 15 is a diagram for explanation of controlling the amount of phase shift based on the difference between monitor electric signals from the first and second photodetectors 4-1, 4-2. The two kinds of coupled lights output from the optical coupler 2d' have a phase difference of π/2 from each other and intensity patterns inversed relative to each other like the relationship between the two output lights (phase-modulated light and non-phase-modulated light) from the optical coupler 3ab as described in the first embodiment.

Specifically, as described above, the coupled light power at the change timings (see t2, t4, t7, t9 in FIG. 2) at which the signal points of adjacent symbols change in the multilevel optical phase-modulated light output from the optical coupler 2f varies depending on the statuses of the amount of phase shift in the phase-shift unit 6 (status #3-1 to #3-3). "Monitor A signal" and "Monitor B signal" are coupled lights output from two output routes of the optical coupler 2d', respectively.

Here, when the amount of phase shift in the phase-shift unit 6 is proper (π/2) (status #3-1), the two kinds of coupled lights "Monitor A signal" and "Monitor B signal" are at the same level. On the other hand, when the amount of phase shift in the phase-shift unit 6 is not proper and smaller than π/2 (status #3-2), "Monitor A signal" is larger than that in the status #3-1 and "Monitor B signal" is smaller than that in the status #3-1. Further, when the amount of phase shift in the phase-shift unit 6 is not proper and larger than π/2 (status #3-3), "Monitor A signal" is smaller than that in the status #3-1 and "Monitor B signal" is larger than that in the status #3-1.

At the timings between symbols other than the above described change timings, both or one of the non-phase-modulated lights from the phase modulators 3-1, 3-2 are extinguished, and no interference occurs and no variation is caused depending on the amount of phase shift in the coupled light power ("Monitor A signal" and "Monitor B signal").

FIG. 15 shows light intensity of the two kinds of coupled lights relative to the amount of phase shift as described above, and, in FIG. 16, A1 shows the light intensity of the coupled light detected by the first photodetector 4-1 ("Monitor A signal") and A2 shows the light intensity (Monitor electric signal level) of the coupled light detected by the second photodetector 4-2 ("Monitor B signal"). As shown in FIG. 15, the light intensity difference between the two kinds of coupled lights detected by the first and second photodetectors 4-1, 4-2 becomes zero when the amount of phase shift is at 90 degrees, and becomes larger as the amount of shift from 90 degrees is larger.

Accordingly, the phase-shift control unit 5B can control the amount of phase shift to the optimum value (π/2) by controlling the amount of phase shift in the phase-shift unit 6 so that the difference between the monitor electric signals from the first and second photodetectors 4-1, 4-2 may be the minimum.

Figure 16:
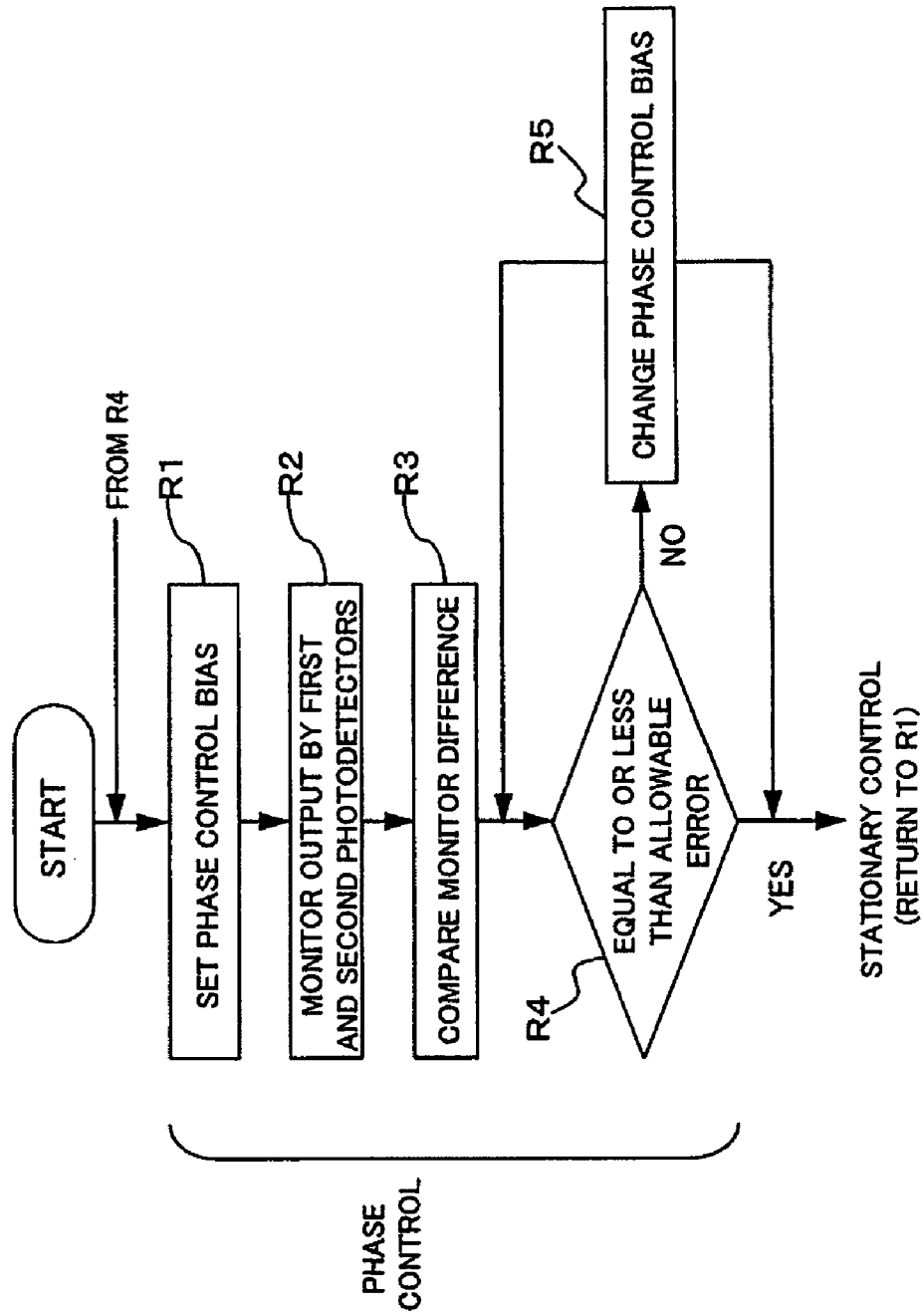
FIG. 16 is a flowchart for explanation of an operation of a modification of the third embodiment.

FIG. 16 is a flowchart for explanation of the control of the multilevel optical phase modulator 30 having the above described configuration.

In the multilevel optical phase modulator 30 according to the third embodiment, the phase difference between CW lights input to the phase modulators 3-1, 3-2 is provided by the amount of phase shift in the phase-shift unit 6 given by the amount of control (phase control bias) set in the phase-shift control unit 5B (step R1). In the first and second photodetectors 4-1, 4-2, the two kinds of coupled lights as the coupled lights of the non-phase-modulated lights output from the respective phase modulators 3-1, 3-2 having a phase difference of π/2 are monitored ("PD monitor" at step R2). In the phase-shift control unit 5B, the electric signal levels as the monitor results in the first photodetector 4-1 and the second photodetector 4-2 are compared (step R3).

Consequently, when the level difference between the monitor electric signals from the first and second photodetectors 4-1, 4-2 is equal to or less than the allowable error, the control signal is output to the phase-shift unit 6 so that the amount of phase shift to the phase-shift unit 6 may be maintained (from YES route of step R4 to step R1). On the other hand, when the difference is greater than the allowable error, the control signal is output to the phase-shift unit 6 so that the amount of phase shift to the phase-shift unit 6 may be changed to be equal to or less than the allowable error (from NO route of step R4 to step R5).

As described above, according to the third embodiment, since the non-phase-modulated lights from the plural Mach-Zehnder phase modulators can be coupled and output as coupled light by the optical coupler 2d' as the second coupling unit as is the above described case of the first embodiment, there are advantages that the monitor light unaffected by the multilevel phase-modulated component can be taken out, and the monitor light can be taken out without reduction of the power of the multilevel phase-modulated light.

[C1] Explanation of Modification of Third Embodiment

Figure 17:
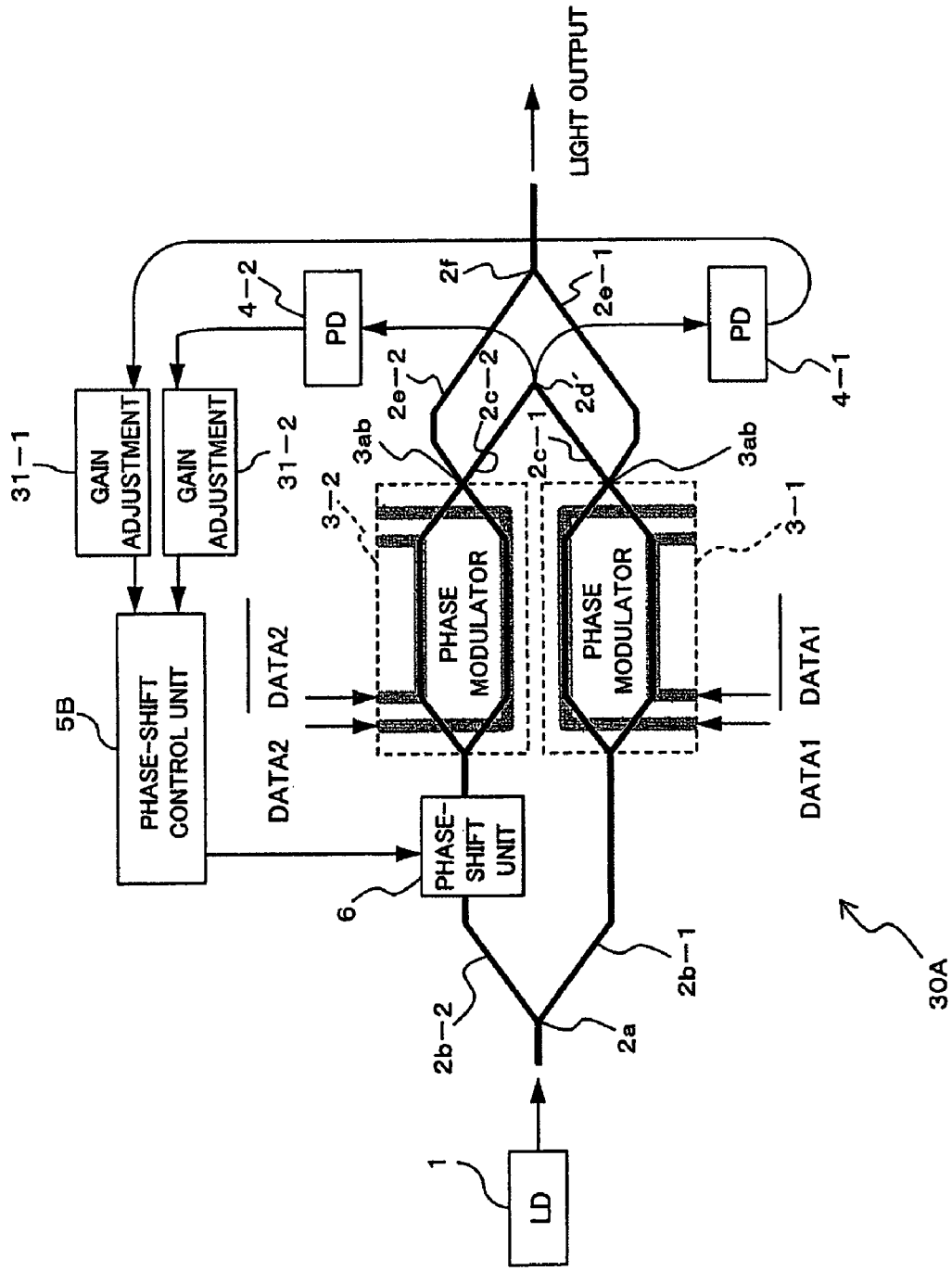
FIG. 17 shows a multilevel optical phase modulator according to a modification of the third embodiment.

FIG. 17 shows a multilevel optical phase modulator 30A according to a modification of the third embodiment. The multilevel optical phase modulator 30A shown in FIG. 17 is different from that in the above described third embodiment (see the sign 30 in FIG. 14) in that gain adjustment units 31-1, 31-2 for adjustment of gain deviation between the first and second photodetectors 4-1, 4-2 are provided, but the rest of the configuration is basically the same. In FIG. 17, the same signs as those in FIG. 14 show nearly the same parts.

The gain adjustment units 31-1, 31-2 adjust the gain deviation of the monitor signals in the first and second photodetectors 4-1, 4-2 and output them to the phase-shift control unit 5B. Thereby, the comparison accuracy of monitor electric signals for control of the amount of phase shift can be improved in the phase-shift control unit 5B.

[D] Explanation of Fourth Embodiment

Figure 18:
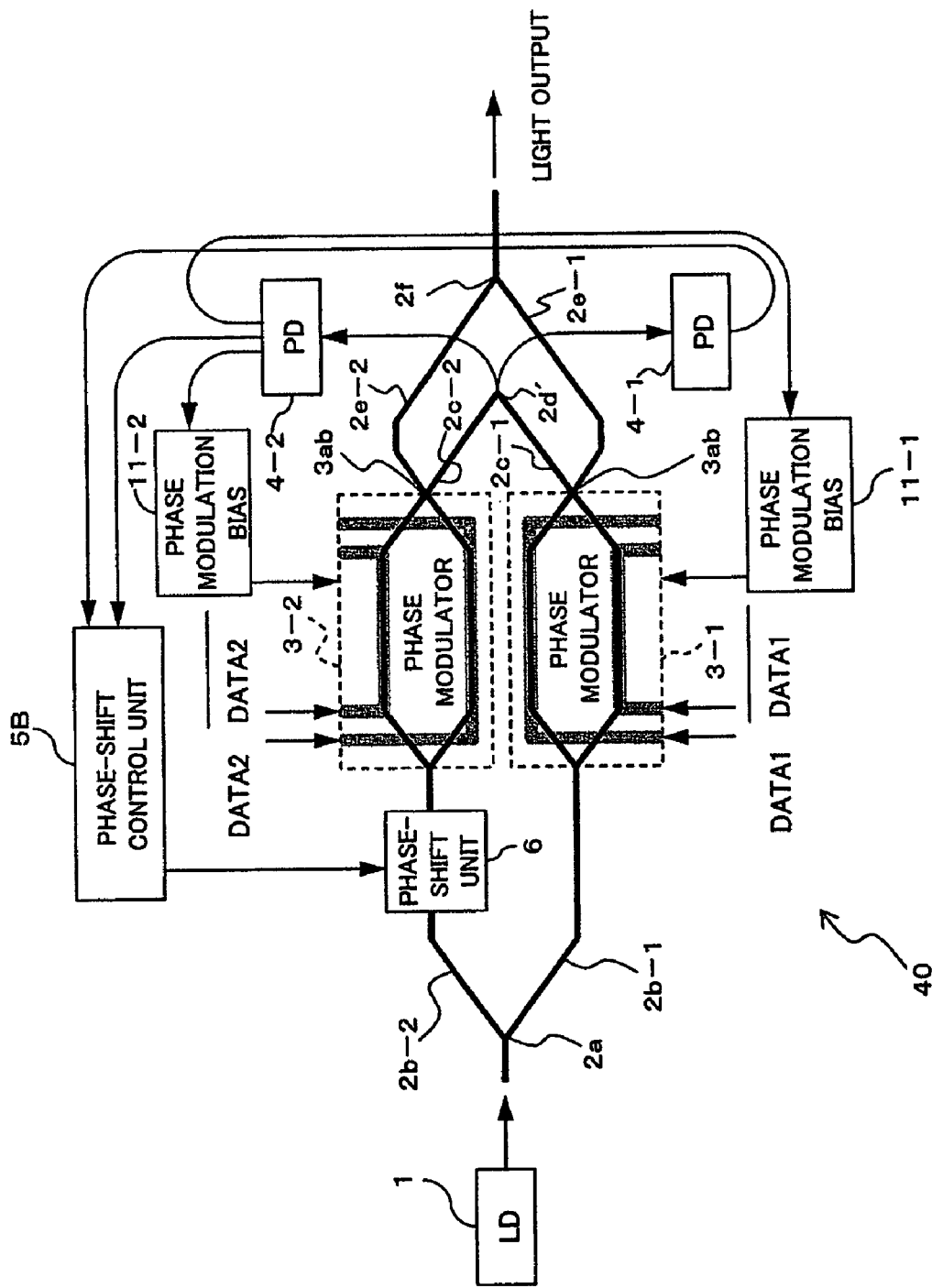
FIG. 18 shows a multilevel optical phase modulator according to a fourth embodiment.

FIG. 18 shows a multilevel optical phase modulator 40 according to the fourth embodiment. The multilevel optical phase modulator 40 shown in FIG. 18 further includes phase modulation bias control units 11-1, 11-2 having the same functions as those shown in FIG. 10 in addition to the one in the above described third embodiment (see sign 30 in FIG. 14). In FIG. 18, the same signs as those in FIGS. 10 and 14 show nearly the same parts.

Note that, in the fourth embodiment, unlike the one shown in FIG. 10, in the phase modulation bias control unit 11-1, the DC bias of the phase modulator 3-1 is controlled based on the monitor electric signal from the first photodetector 4-1. And in the phase modulation bias control unit 11-2, the DC bias of the phase modulator 3-2 is controlled based on the monitor electric signal from the second photodetector 4-2.

In this case, the earlier stabilization of the controls can be expected in such a manner that the control of the phase-shift unit 6 by the phase-shift control unit 5 is first performed, and then, the DC bias controls of the two phase modulators 3-1, 3-2 by the phase modulation bias control units 11-1, 11-2 are sequentially performed, for example.

Therefore, also in the multilevel optical phase modulator 40 according to the fourth embodiment, there are the same advantages as those in the above described third embodiment, and additionally, there is an advantage that the monitor light can be taken in without being affected by the multilevel optical phase-modulated component or reducing the power of the multilevel optical phase-modulated light, and the operating point drift in the Mach-Zehnder phase modulators 3-1, 3-2 can be compensated.

[D1] Explanation of Modification of Fourth Embodiment

Figure 19:
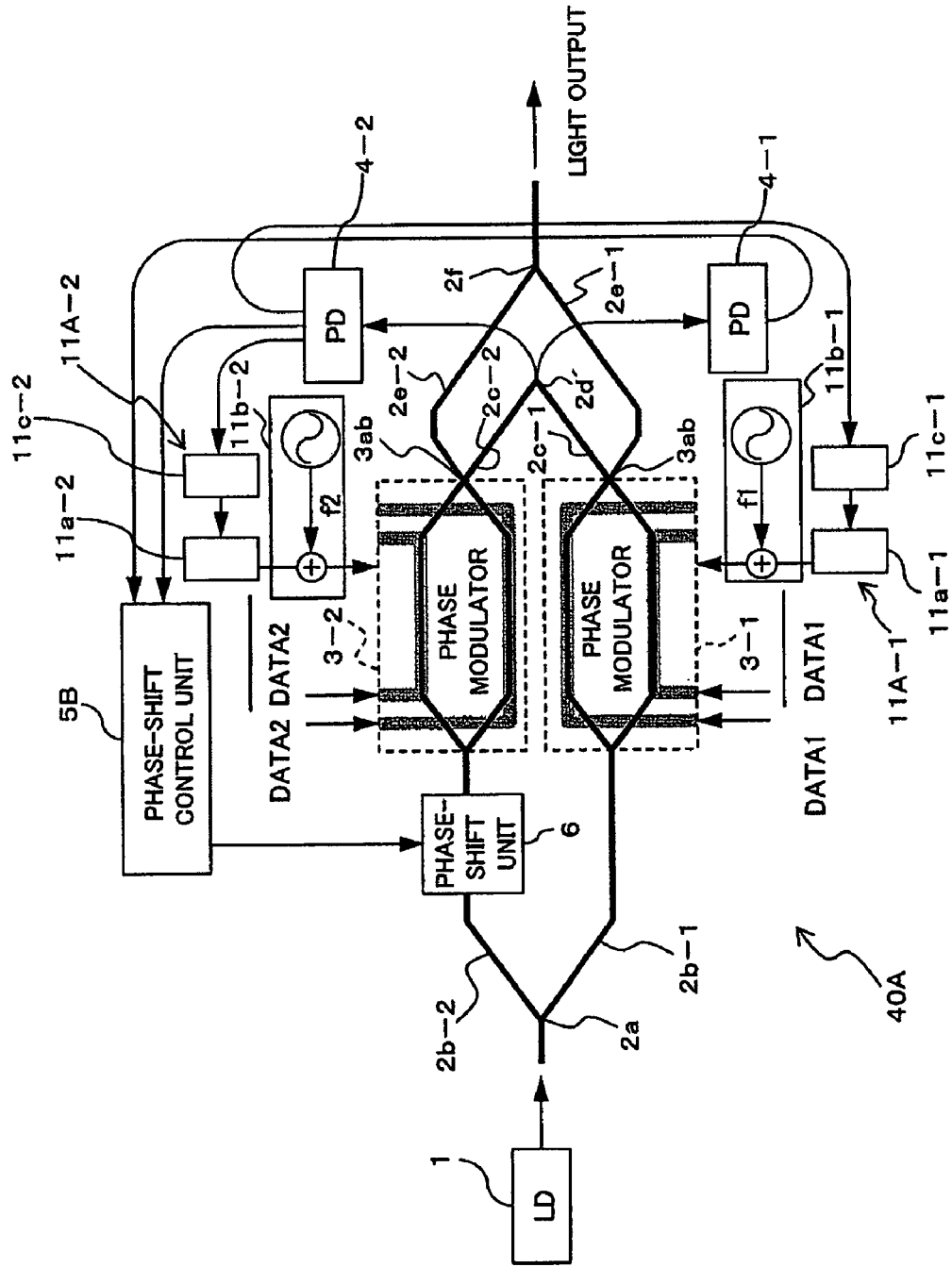
FIG. 19 shows a multilevel optical phase modulator according to a modification of the fourth embodiment.

FIG. 19 shows a multilevel optical phase modulator 40A according to a modification of the fourth embodiment. In comparison to the one in the fourth embodiment (see sign 40 in FIG. 18), the multilevel optical phase modulator 40A shown in FIG. 19 is provided with phase modulation bias control units 11A-1, 11A-2 that search for the optimum control points for the DC biases by dithering like those provided in the above described multilevel optical phase modulator 20B shown in FIG. 13. In FIG. 19, the same signs as those in FIGS. 13, 18 show nearly the same parts.

Note that, in the one shown in FIG. 19, in the phase modulation bias control unit 11A-1, the DC bias of the phase modulator 3-1 is controlled based on the monitor electric signal from the first photodetector 4-1 is controlled by dithering, and, in the phase modulation bias control unit 11A-2, the monitor electric signal from the second photodetector 4-2 is input and the DC bias of the phase modulator 3-2 is controlled based on the monitor electric signal by dithering.

Therefore, also in this case, the same advantages as those of the above described fourth embodiment can be obtained.

[E] Explanation of Fifth Embodiment

Figure 20:
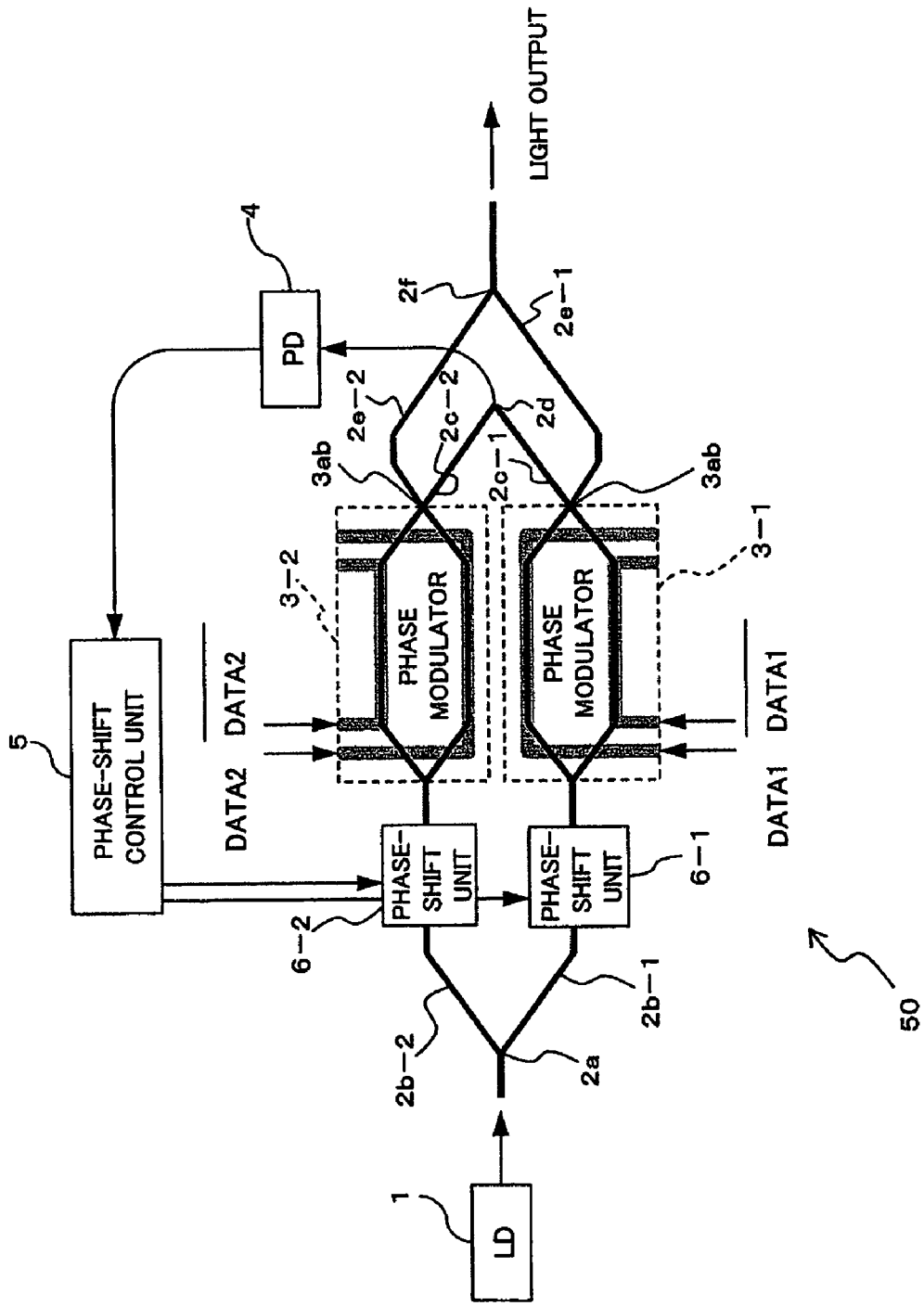
FIG. 20 shows a multilevel optical phase modulator according to a fifth embodiment.

FIG. 20 shows a multilevel optical phase modulator 50 according to the fifth embodiment. The multilevel optical phase modulator 50 shown in FIG. 20 is different from the one in the above described first embodiment (see the sign 10 in FIG. 1) in that phase-shift units 6-1, 6-2 for making the phase difference between CW lights input to the phase modulators 3-1, 3-2 proper ($\pi/2$) are provided on both of the arm waveguides 2b-1, 2b-2.

The phase-shift control unit 5 in this case performs control of making the phase difference between CW lights input to the phase modulators 3-1, 3-2 proper ($\pi/2$) by variably controlling both or one of the phase-shift units 6-1, 6-2 based on the monitor electric signal from the photodetector 4.

Therefore, also in the case of such a configuration, the same effect as that in the above described first embodiment can be obtained.

[F] Explanation of Sixth Embodiment

Figure 21:
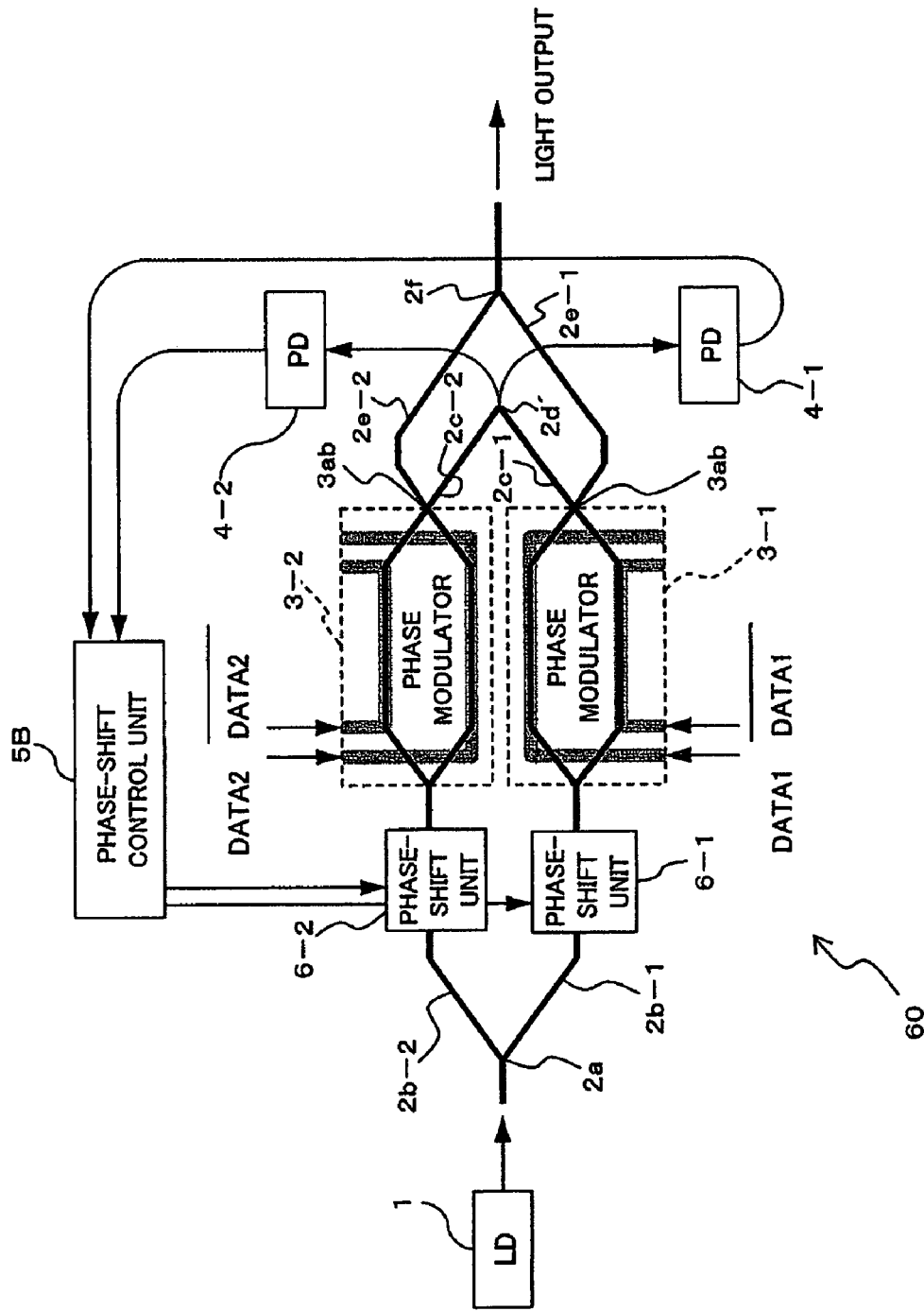
FIG. 21 shows a multilevel optical phase modulator according to a sixth embodiment.

FIG. 21 shows a multilevel optical phase modulator 60 according to the sixth embodiment. The multilevel optical phase modulator 60 shown in FIG. 21 is different from the one in the above described third embodiment (see the sign 30 in FIG. 14) in that phase-shift units 6-1, 6-2 for making the phase difference between CW lights input to the phase modulators 3-1, 3-2 proper ($\pi/2$) are provided on both of the arm waveguides 2b-1, 2b-2.

The phase-shift control unit 5B in this case performs control of making the phase difference between CW lights input to the phase modulators 3-1, 3-2 proper ($\pi/2$) by variably controlling both or one of the phase-shift units 6-1, 6-2 based on the monitor electric signals from the photodetectors 4-1, 4-2.

Therefore, also in the case of such a configuration, the same effect as that in the above described third embodiment can be obtained.

[G] Explanation of Seventh Embodiment

Figure 22:
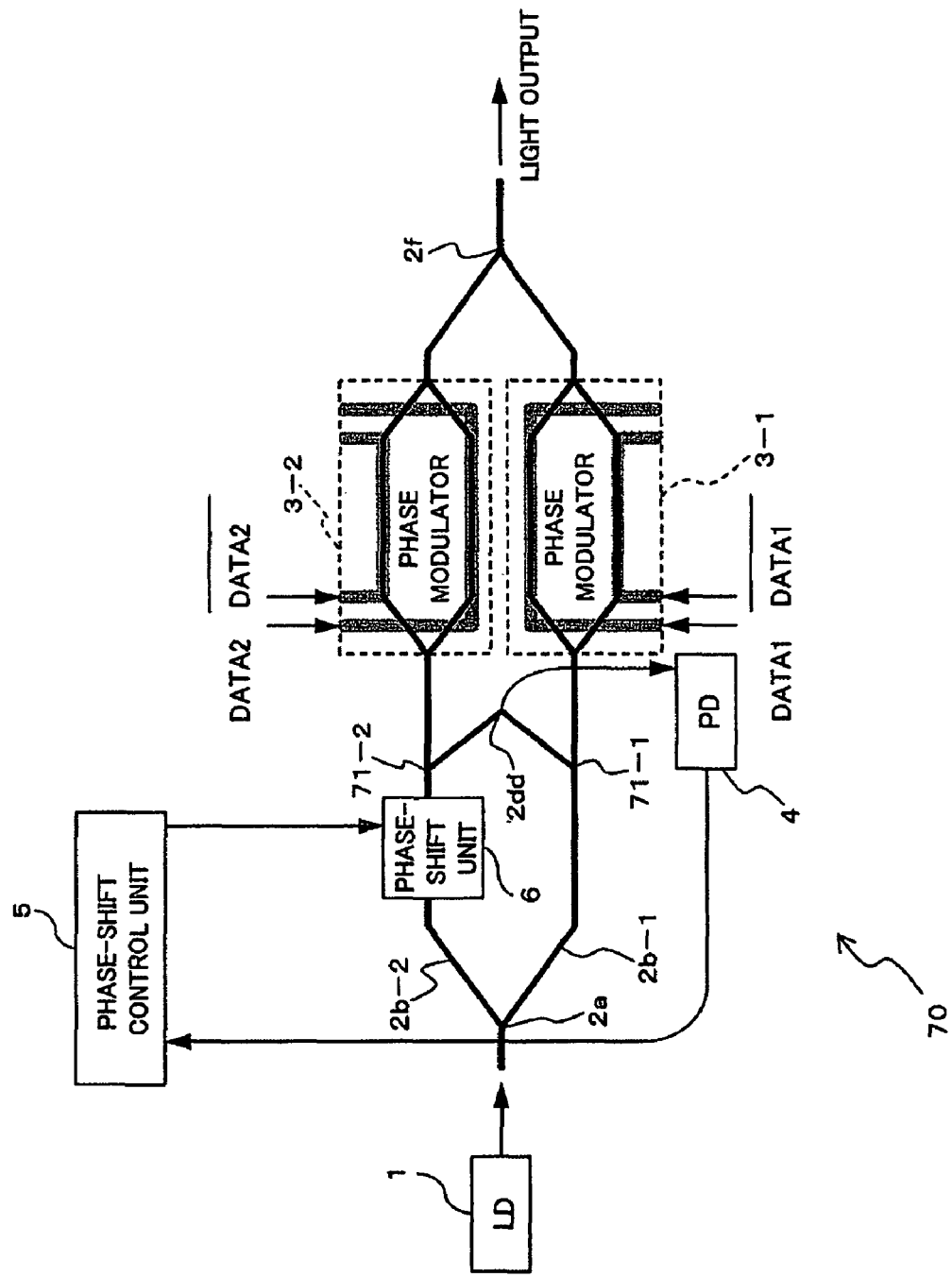
FIG. 22 shows a multilevel optical phase modulator according to a seventh embodiment.

FIG. 22 shows a multilevel optical phase modulator 70 according to the seventh embodiment. The multilevel optical phase modulator 70 shown in FIG. 22 includes plural (two in the seventh embodiment) Mach-Zehnder phase modulators (phase modulating units) 3-1, 3-2, an optical coupler 2f as a first coupling unit that couples the phase-modulated lights from the two Mach-Zehnder phase modulators 3-1, 3-2 and outputs the light as multilevel optical phase-modulated signal light, and an optical coupler 2dd as a second coupling unit that couples the divided lights of input lights to the two Mach-Zehnder phase modulators 3-1, 3-2 and outputs the light as coupled light. In FIG. 22, the same signs as those in FIG. 1 show nearly the same parts.

Further, in the multilevel optical phase modulator 70, a light source (LD) 1 that outputs CW lights, and an optical coupler 2a as a first dividing unit that divides the light input from the light source 1 into at least the number corresponding to the number of the phase modulators 3-1, 3-2 ("two" in the seventh embodiment) are provided. The respective continuous lights divided by the optical coupler 2a are input to the phase modulators 3-1, 3-2 through arm waveguides 2b-1, 2b-2, respectively.

Further, the phase-shift unit 6 is provided on the arm waveguide 2b-2 between the optical coupler 2a and the phase modulator 3-2, for example, and performs phase shift so that the CW lights propagating on the arm waveguides 2b-1, 2b-2 may have a phase difference of $\pi/2$. Thereby, the CW lights provided with the phase difference by the phase-shift unit 6 are supplied as input lights to the Mach-Zehnder phase modulators 3-1, 3-2.

Here, second dividing units 71-1, 71-2 divide a part of the input lights to the Mach-Zehnder phase modulators 3-1, 3-2 as divided lights output to the optical coupler 2dd as the second coupling unit, respectively. The optical coupler 2dd couples (multiplexes) the input two divided lights and supplies the light to the photodetector 4. The photodetector 4 monitors the light power of the multiplexed light of the lights respectively divided by the second dividing units 71-1, 71-2, and outputs a monitor electric signal according to the light power to the phase-shift control unit 5.

Further, regarding the power of the coupled light monitored in the photodetector 4, the light power of the multiplexed light differs depending on the phase difference between two CW lights to be coupled substantially similarly to the above described case in FIG. 5. In other words, in the phase-shift control unit 5, the light power of the multiplexed light and the relationship of the phase difference between two CW lights are held in advance, and thereby, the phase difference between the two CW lights can be uniquely derived from the multiplexed light power monitored by the photodetector 4. Further, in the phase-shift control unit 5, the amount of phase shift to the phase-shift unit 6 is controlled so that the phase difference between the two CW lights may be optimum ($\pi/2$).

Thereby, direct current light unaffected by the phase modulation by the phase modulators 3-1, 3-2 may be used as the monitor light for controlling the amount of phase shift, and thus, the intensity fluctuations when the amount of phase shift is controlled can be prevented.

Figure 23:
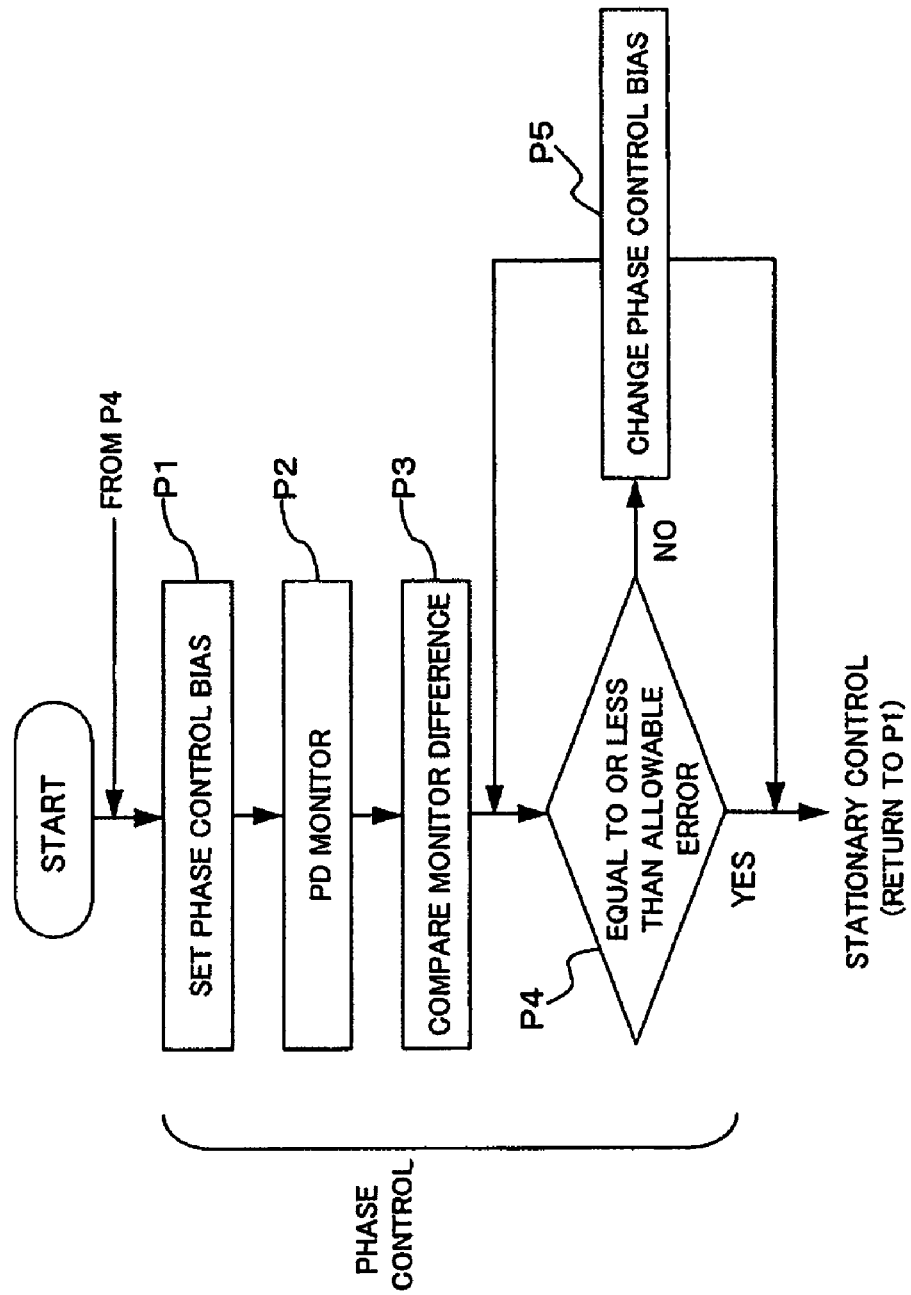
FIG. 23 is a flowchart for explanation of an operation of the seventh embodiment.

In the multilevel optical phase modulator 70 having the above described configuration, as shown in FIG. 23, the phase difference of the CW lights input to the phase modulators 3-1, 3-2 is provided by the amount of phase shift in the phase-shift unit 6 given by the amount of control (phase control bias) set in the phase-shift control unit 5 (step P1). In the photodetector 4, the coupled light of the CW lights (provided with the phase difference) output from the respective second dividing units 71-1, 71-2 is received by the photodetector 4 via the optical coupler 2*dd*. Then, in the photodetector 4, the monitor electric signal according to the light power of the received coupled light is output to the phase-shift control unit 5 ("PD monitor" at step P2).

In the phase-shift control unit 5, the monitor result in the photodetector 4 and the light power value (reference value) when the phase difference is proper are compared (step P3).

Consequently, when the difference between the monitor result and the reference value is equal to or less than the allowable error, the control signal is output to the phase-shift unit 6 so that the amount of phase shift to the phase-shift unit 6 may be maintained (from YES route of step P4 to step P1). On the other hand, when the difference is greater than the allowable error, the control signal is output to the phase-shift unit 6 so that the amount of phase shift to the phase-shift unit 6 may be changed to be equal to or less than the allowable error (from NO route of step P4 to step P5).

As described above, according to the seventh embodiment, since the divided lights of the lights input to the plural Mach-Zehnder phase modulators can be coupled and output as coupled light by the optical coupler 2*dd* as the second coupling unit, there is an advantage that the intensity fluctuations when the amount of phase shift is controlled can be prevented through the control of the amount of phase shift using the coupled light.

[G1] Explanation of Modification of Seventh Embodiment

Figure 24:
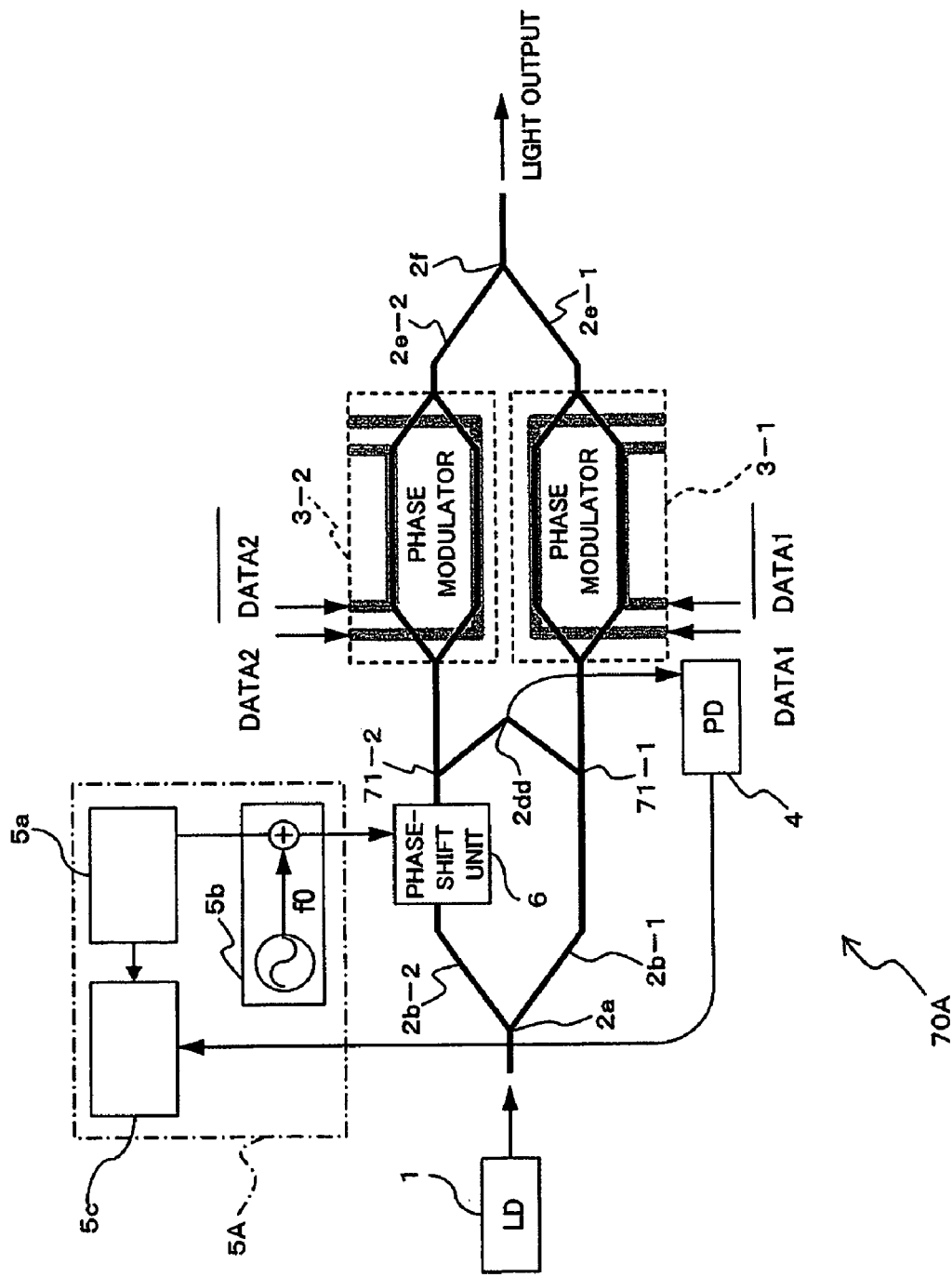
FIG. 24 shows a multilevel optical phase modulator according to a modification of the seventh embodiment.

FIG. 24 shows a multilevel optical phase modulator 70A according to a modification of the seventh embodiment. The multilevel optical phase modulator 70A shown in FIG. 24 is provided with a phase-shift control unit 5A having substantially equal functions as those shown in FIG. 7 is additionally provided for searching for the amount of phase shift by dithering, compared to the above described seventh embodiment (see the sign 70 in FIG. 22). In FIG. 24, the same signs as those in FIGS. 7 and 22 show nearly the same parts. The equal advantage as that of the seventh embodiment can be obtained because the amount of phase shift can be controlled with the configuration.

[H] Explanation of Eighth Embodiment

Figure 25:
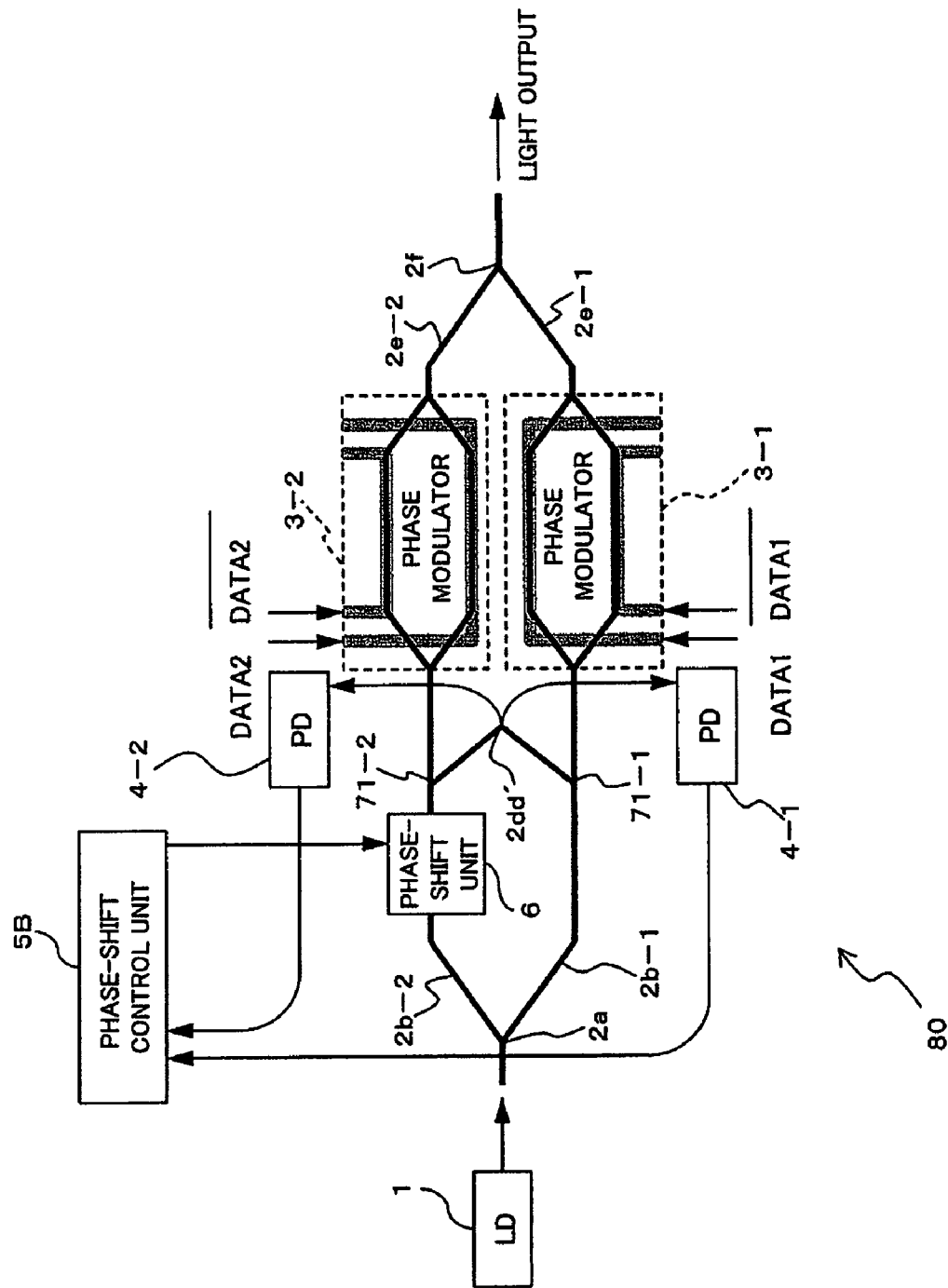
FIG. 25 shows a multilevel optical phase modulator according to an eighth embodiment.

FIG. 25 shows a multilevel optical phase modulator 80 according to the eighth embodiment. The multilevel optical phase modulator 80 shown in FIG. 25 includes a 2-input/2-output optical coupler 2*dd*' as the second coupling unit, and first and second photodetectors 4-1, 4-2 that respectively receive the lights output from the optical coupler 2*dd*', and the same phase-shift control unit 5B as that in the third embodiment. In FIG. 25, the same signs as those in FIGS. 14, 22 show nearly the same parts.

The optical coupler 2*dd*' is the same as the optical coupler 2*dd* in the seventh embodiment in that the CW lights from the second dividing units 71-1, 71-2 are coupled, but individually outputs two kinds of lights having the phase difference of $\pi/2$ from each other and having intensity patterns inverted with respect to each other, for example, as coupled lights according to the optical coupler 2*d*' in the above described third embodiment. That is, one of the coupled lights in such a phase relationship is received in the first photodetector 4-1, and the other of the coupled lights is received in the second photodetector 4-2.

Thereby, the phase-shift control unit 5B can control the amount of phase shift in the phase-shift unit 6 based on the difference between the monitor electric signals from the first and second photodetectors 4-1, 4-2 as is the case of the above described third embodiment.

Thus, also in the eighth embodiment, since the divided lights of the lights input to the plural Mach-Zehnder phase modulators can be coupled and output as coupled light by the optical coupler 2*dd*' as the second coupling unit, there is an advantage that the intensity fluctuations when the amount of phase shift is controlled can be prevented through the control of the amount of phase shift using the coupled light.

[H1] Explanation of Modification of Eighth Embodiment

Figure 26:
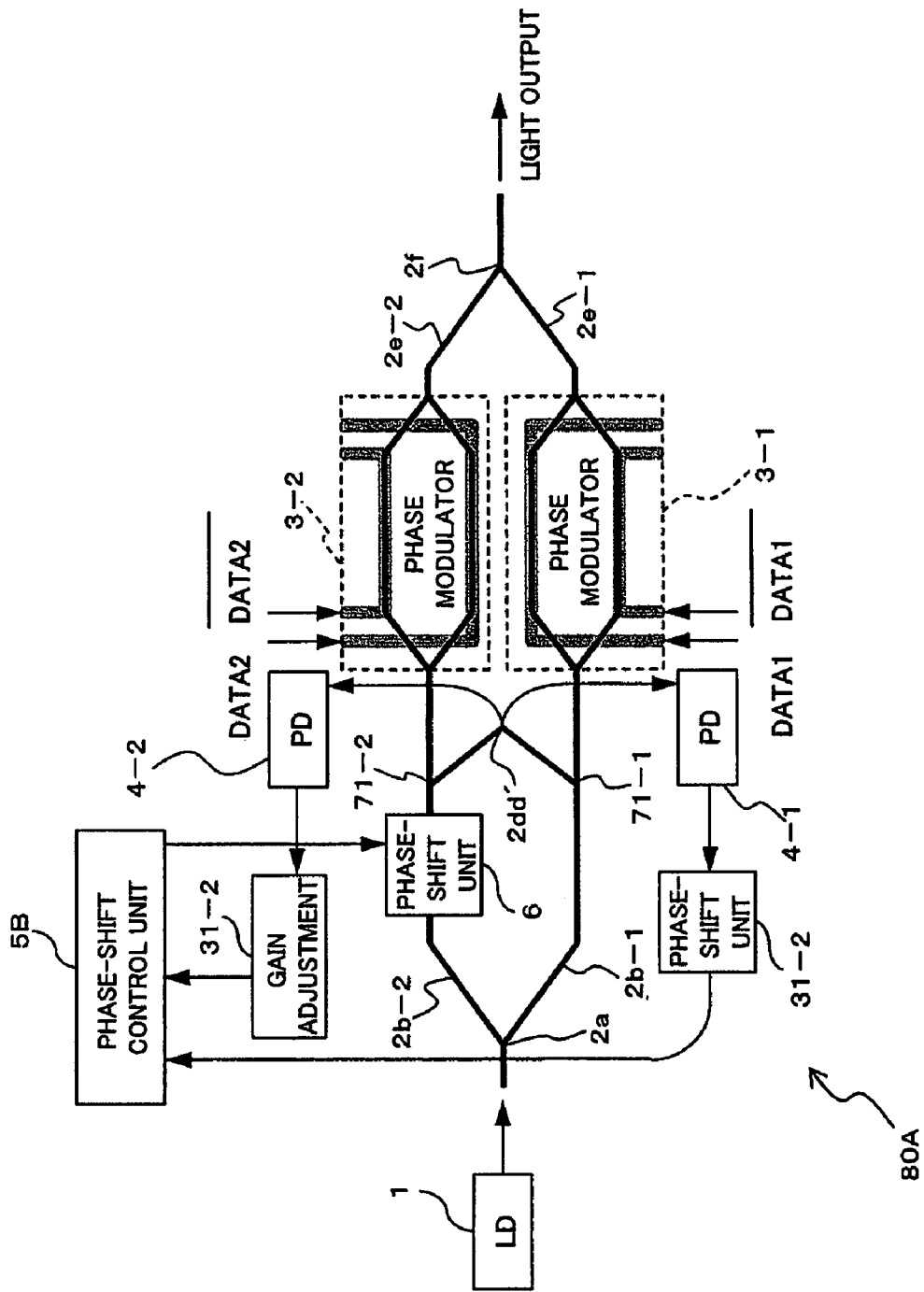
FIG. 26 shows a multilevel optical phase modulator according to a modification of the eighth embodiment.

FIG. 26 shows a multilevel optical phase modulator 80A according to a modification of the eighth embodiment. The multilevel optical phase modulator 80A shown in FIG. 26 is different from that in the above described eighth embodiment (see the sign 80 in FIG. 25) in that gain adjustment units 31-1, 31-2 for adjustment of gain deviation between the first and second photodetectors 4-1, 4-2 are provided, but the rest of the configuration is basically the same. The gain adjustment units 31-1, 31-2 are basically the same as those shown in FIG. 17, and, in FIG. 26, the same signs as those in FIGS. 17 and 25 show nearly the same parts.

The gain adjustment units 31-1, 31-2 adjust the gain deviation of the monitor signals in the first and second photodetectors 4-1, 4-2 and output them to the phase-shift control unit 5B. Thereby, the comparison accuracy of monitor electric signals for control of the amount of phase shift can be improved in the phase-shift control unit 5B.

[I] Explanation of Ninth Embodiment

Figure 27:
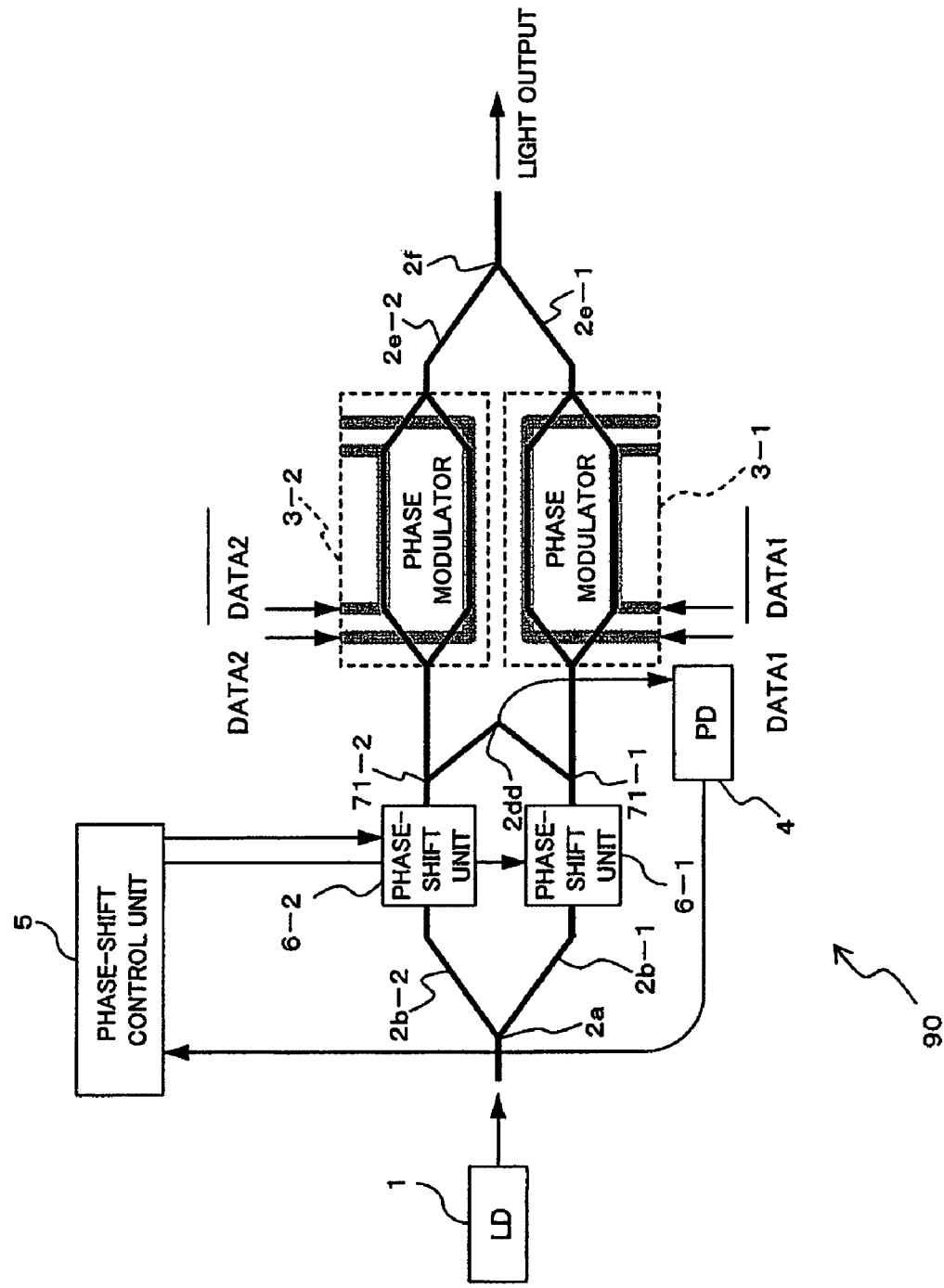
FIG. 27 shows a multilevel optical phase modulator according to a ninth embodiment.

FIG. 27 shows a multilevel optical phase modulator 90 according to the ninth embodiment. The multilevel optical phase modulator 90 shown in FIG. 27 is different from that in the above described seventh embodiment (see the sign 70 in FIG. 22) in that phase-shift units 6-1, 6-2 for making the phase difference between CW lights input to the phase modulators 3-1, 3-2 proper ($\pi/2$) are provided on both of the arm waveguides 2*b*-1, 2*b*-2.

Accordingly, the phase-shift control unit 5 in this case performs control of making the phase difference between CW lights input to the phase modulators 3-1, 3-2 proper ($\pi/2$) by variably controlling both or one of the phase-shift units 6-1, 6-2 based on the monitor electric signal from the photodetector 4.

Therefore, also in the case of such a configuration, the same effect as that in the above described seventh embodiment can be obtained.

[J] Explanation of Tenth Embodiment

Figure 28:
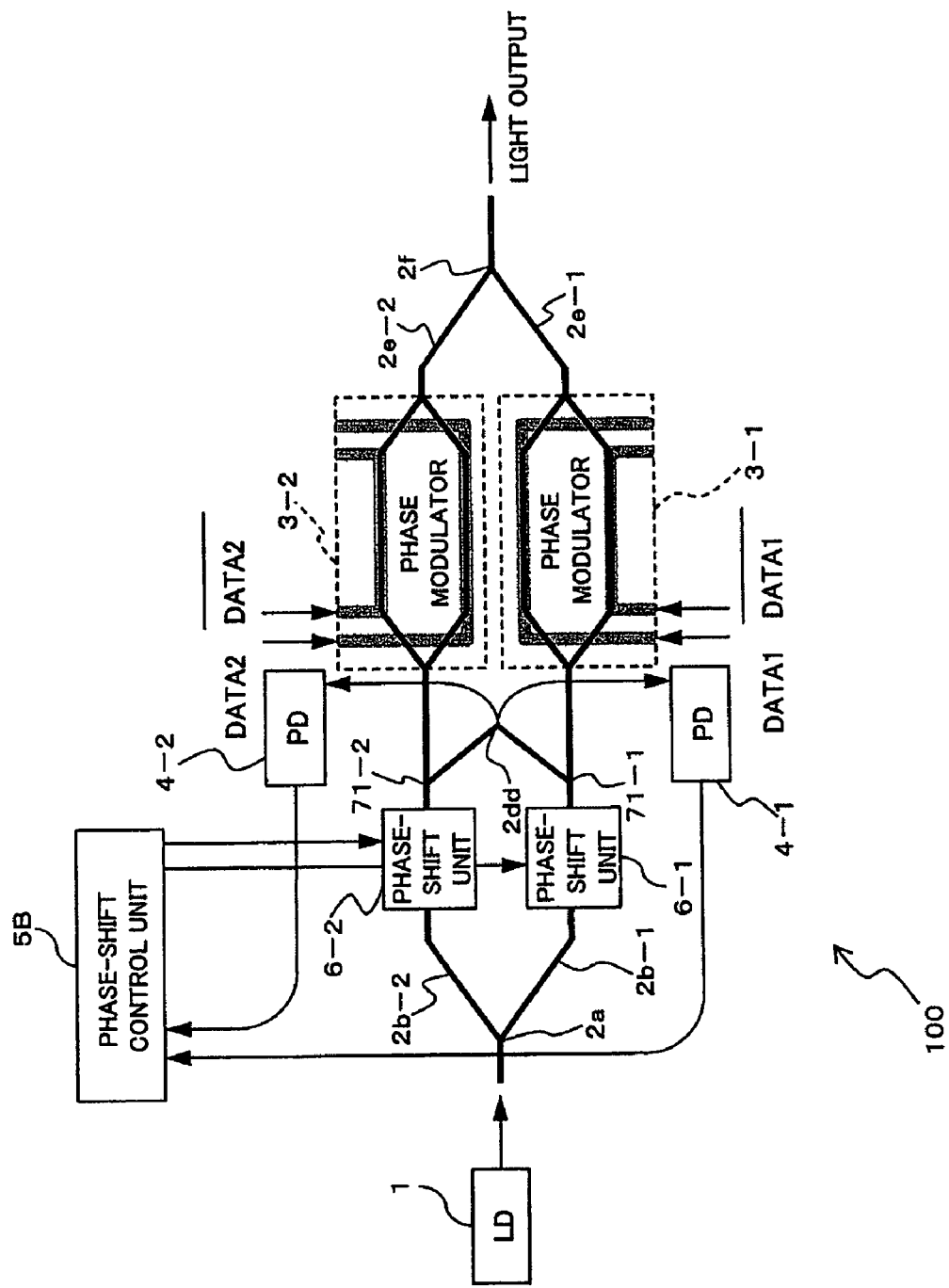
FIG. 28 shows a multilevel optical phase modulator according to a tenth embodiment.

FIG. 28 shows a multilevel optical phase modulator 100 according to the tenth embodiment. The multilevel optical phase modulator 100 shown in FIG. 28 is different from that in the above described eighth embodiment (see the sign 80 in FIG. 25) in that phase-shift units 6-1, 6-2 for making the phase difference between CW lights input to the phase modulators 3-1, 3-2 proper ($\pi/2$) are provided on both of the arm waveguides 2b-1, 2b-2.

The phase-shift control unit 5B in this case performs control of making the phase difference between CW lights input to the phase modulators 3-1, 3-2 proper ($\pi/2$) by variably controlling both or one of the phase-shift units 6-1, 6-2 based on the monitor electric signals from the photodetectors 4-1, 4-2.

Therefore, also in the case of such a configuration, the same effect as that in the above described eighth embodiment can be obtained.

[K] Others

Not only the above described embodiments, but various modifications without departing from the scope of the claimed invention can be implemented.

For example, in the above described first to sixth embodiments, the number of Mach-Zehnder phase modulators is not limited to two, but may be greater than two.

In this case, when the number of phase modulating units (see signs 3-1, 3-2 in FIG. 1 and the like) is n (n is an integral number equal to or greater than 2), the dividing unit (see sign 2a in FIG. 1 and the like) is configured to divide the input light at least into n, the phase-shift unit (see sign 6 in FIG. 1 and the like) that performs phase shift on the n lights from the dividing unit 2a at predetermined phase intervals is provided, and configured to respectively supply the n lights from the phase-shift unit 6 as input lights to the n Mach-Zehnder phase modulators 3-1, 3-2.

Further, in the above described seventh to tenth embodiments, the number of phase modulators 3-1, 3-2 is not limited to two, but may be greater than two. Here, when the number of phase modulating units (see signs 3-1, 3-2 in FIG. 22 and the like) is n (n is an integral number equal to or greater than 2), the dividing unit (see sign 2a in FIG. 22 and the like) that divides the input light at least into n is provided and the phase-shift unit (see sign 6 in FIG. 22 and the like) that performs phase shift on the n lights from the dividing unit 2a at predetermined phase intervals is provided, and configured to respectively supply the n lights from the phase-shift unit 6 as input lights to the n phase modulators 3-1, 3-2, and the second dividing unit (see signs 71-1, 71-2 in FIG. 22 and the like) that respectively divides a part of the input lights to the n phase modulators 3-1, 3-2 as divided lights to be output to the second coupling unit (see sign 2dd in FIG. 22 and the like) may be provided.

In other ways, the device of the invention can be manufactured according to the disclosure of the above described embodiments.

What is claimed is:

1. A multilevel optical phase modulator comprising:
a phase-shifter that shifts a phase of an input light;
plural (n, n is an integral number equal to or greater than 2) phase modulators that respectively phase-modulate input lights which include the input light from the phase-shifter;
a first coupler that couples and outputs the phase-modulated lights from the plural phase modulators as multilevel optical phase-modulated signal light; and
a second coupler that couples and outputs non-phase-modulated lights from the plural phase modulators as coupled light.

2. The multilevel optical phase modulator according to claim 1, further comprising a first divider that divides input light into at least the n, and configured to supply the light from the first divider as the input light to the phase-shifter.

3. A multilevel optical phase modulator comprising:
a phase-shifter that shifts a phase of an input light;
plural (n, n is an integral number equal to or greater than 2) phase modulators that respectively phase-modulate input lights which include the input light from the phase-shifter;
a first coupler that couples and outputs the phase-modulated lights from the plural phase modulators as multilevel optical phase-modulated signal light;
a second divider that divides a part of the input lights to the plural phase modulators; and
a second coupler that couples and outputs non-phase-modulated lights from the second divider as coupled light.

4. The multilevel optical phase modulator according to claim 3, further comprising a first divider that divides input light into at least the n, and configured to supply the light from the first divider as the input light to the phase-shifter.

5. The multilevel optical phase modulator according to claim 1, wherein the second coupler includes plural input routes according to the number of the phase modulators, and m (m is an integral number equal to or greater than 1) output route(s) that guide(s) the coupled light of the lights from the plural input routes.

6. The multilevel optical phase modulator according to claim 3, wherein the second coupler includes plural input routes according to the number of the phase modulators, and m (m is an integral number equal to or greater than 1) output route(s) that guide(s) the coupled light of the lights from the plural input routes.

7. The multilevel optical phase modulator according to claim 1, wherein the second coupler includes plural input routes according to the number of the phase modulators, and m (m is an integral number equal to or greater than 1) pairs of (first and second) output routes that guide the coupled light of the lights from the plural input routes.

8. The multilevel optical phase modulator according to claim 3, wherein the second coupler includes plural input routes according to the number of the phase modulators, and m (m is an integral number equal to or greater than 1) pairs of (first and second) output routes that guide the coupled light of the lights from the plural input routes.

9. The multilevel optical phase modulator according to claim 1, further comprising at least one photodetector that receives the coupled light from the second coupler, and
a phase-shifter controller that controls an amount of phase shift in the phase-shifter based on the coupled light received by the photodetector.

10. The multilevel optical phase modulator according to claim 3, further comprising at least one photodetector that receives the coupled light from the second coupler, and a phase-shifter controller that controls an amount of phase shift in the phase-shifter based on the coupled light received by the photodetector.

11. The multilevel optical phase modulator according to claim 9, wherein the photodetector includes at least one pair of (first and second) photodetectors that receive the coupled light from the second coupler, and wherein the phase-shifter controller controls the amount of phase shift in the phase-shifter based on the coupled light received by the photodetectors.

12. The multilevel optical phase modulator according to claim 3, further comprising at least one pair of (first and second) photodetectors that receive the coupled light from the second coupler, and a phase-shifter controller that controls an amount of phase shift in the phase-shifter based on the coupled light received by the photodetectors.

13. The multilevel optical phase modulator according to claim 2, further comprising a phase modulation bias controller that controls biases in the phase modulators based on the coupled light received by the photodetector.

14. The multilevel optical phase modulator according to claim 9, wherein the photodetector includes at least one pair of (first and second) photodetectors that receive the coupled light from the second coupler, and the multilevel optical phase modulator further comprising a phase modulation bias controller that controls biases in the phase modulators based on the coupled light received by one of the first and second photodetectors.

15. The multilevel optical phase modulator according to claim 1, further comprising optical waveguides that respectively guide the non-phase-modulated lights from the plural phase modulators.

16. The multilevel optical phase modulator according to claim 1, wherein the phase modulated light is light formed by phase-modulating the input light according to a phase modulation sign by the phase modulators, and the non-phase-modulated light is light having intensity inverted with respect to the light formed by phase-modulating the input light according to the phase modulation sign.

17. The multilevel optical phase modulator according to claim 1, wherein the non-phase-modulated light output from the phase modulators has a substantial phase difference of 90 degrees from that of the phase-modulated light output form the phase modulators.

* * * * *